(12) United States Patent
Kito et al.

(10) Patent No.: US 8,065,416 B2
(45) Date of Patent: Nov. 22, 2011

(54) PLAYLIST COMPOSITION APPARATUS, COPYRIGHT MANAGEMENT APPARATUS AND VIEW TERMINAL APPARATUS

(75) Inventors: Toshiyuki Kito, Tokyo (JP); Koichiro Akiyama, Tokyo (JP); Hideki Tsutsui, Kanagawa-ken (JP); Yoshihiro Ohmori, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1378 days.

(21) Appl. No.: 11/447,409

(22) Filed: Jun. 6, 2006

(65) Prior Publication Data

US 2006/0294201 A1   Dec. 28, 2006

(30) Foreign Application Priority Data

Jun. 24, 2005 (JP) .................................. 2005-185082
Sep. 22, 2005 (JP) .................................. 2005-276729

(51) Int. Cl.
*G06F 15/16* (2006.01)
*G06F 15/173* (2006.01)

(52) U.S. Cl. ........ 709/225; 709/203; 709/206; 709/229; 709/231

(58) Field of Classification Search ............... 455/426.1; 705/27, 203, 225, 229, 231
See application file for complete search history.

(56) References Cited

U.S. PATENT DOCUMENTS

| | | | | |
|---|---|---|---|---|
| 5,721,583 A | * | 2/1998 | Harada et al. | 725/24 |
| 6,441,832 B1 | * | 8/2002 | Tao et al. | 715/723 |
| 6,519,648 B1 | * | 2/2003 | Eyal | 709/231 |
| 6,609,199 B1 | * | 8/2003 | DeTreville | 713/172 |
| 6,697,944 B1 | * | 2/2004 | Jones et al. | 713/168 |
| 6,915,176 B2 | * | 7/2005 | Novelli et al. | 700/94 |
| 6,965,770 B2 | * | 11/2005 | Walsh et al. | 455/426.1 |
| 6,990,580 B2 | * | 1/2006 | Go et al. | 713/168 |
| 7,069,451 B1 | * | 6/2006 | Ginter et al. | 705/51 |
| 7,073,063 B2 | * | 7/2006 | Peinado | 713/171 |
| 7,080,037 B2 | * | 7/2006 | Burger et al. | 705/50 |
| 7,124,125 B2 | * | 10/2006 | Cook et al. | 1/1 |
| 7,169,996 B2 | * | 1/2007 | Georges et al. | 84/609 |
| 7,272,859 B2 | * | 9/2007 | Kuriya et al. | 726/29 |
| 7,277,766 B1 | * | 10/2007 | Khan et al. | 700/94 |
| 7,363,372 B2 | * | 4/2008 | Potenzone et al. | 709/225 |
| 7,382,965 B2 | * | 6/2008 | Huang et al. | 386/248 |
| 7,392,342 B2 | * | 6/2008 | Tagawa et al. | 711/115 |
| 7,432,940 B2 | * | 10/2008 | Brook et al. | 345/629 |
| 7,519,667 B1 | * | 4/2009 | Capps | 709/206 |
| 7,769,794 B2 | * | 8/2010 | Moore et al. | 707/831 |
| 2002/0048224 A1 | * | 4/2002 | Dygert et al. | 369/1 |
| 2002/0137496 A1 | * | 9/2002 | Nagaoka et al. | 455/414 |
| 2002/0152278 A1 | * | 10/2002 | Pontenzone et al. | 709/217 |

(Continued)

FOREIGN PATENT DOCUMENTS

JP   2003-050588   2/2003

*Primary Examiner* — Evens J Augustin
(74) *Attorney, Agent, or Firm* — Turocy & Watson, LLP

(57) ABSTRACT

A playlist acquisition unit acquires a playlist including a view segment of contents for a user. The view segment has a start position and an end position in the contents. A copyright information acquisition unit acquires copyright information of the contents from a copyright management apparatus via a network. The copyright management apparatus manages copyright information of each content. A view right information acquisition unit acquires view right information of the user to view the contents. A viewable playlist composition unit composes a viewable playlist by editing the playlist using the copyright information and the view right information. The viewable playlist includes restriction information of the view segment.

22 Claims, 23 Drawing Sheets

U.S. PATENT DOCUMENTS

| | | | |
|---|---|---|---|
| 2003/0050058 A1* | 3/2003 | Walsh et al. | 455/426 |
| 2003/0050834 A1* | 3/2003 | Caplan | 705/14 |
| 2003/0093790 A1* | 5/2003 | Logan et al. | 725/38 |
| 2003/0144918 A1* | 7/2003 | Novelli et al. | 705/26 |
| 2003/0146915 A1* | 8/2003 | Brook et al. | 345/473 |
| 2003/0149975 A1* | 8/2003 | Eldering et al. | 725/34 |
| 2004/0088328 A1* | 5/2004 | Cook et al. | 707/104.1 |
| 2004/0089141 A1* | 5/2004 | Georges et al. | 84/609 |
| 2004/0165006 A1* | 8/2004 | Kirby et al. | 345/740 |
| 2004/0255330 A1* | 12/2004 | Logan | 725/115 |
| 2004/0255334 A1* | 12/2004 | Logan | 725/134 |
| 2004/0255340 A1* | 12/2004 | Logan | 725/145 |
| 2005/0060054 A1* | 3/2005 | Janik | 700/94 |
| 2005/0060741 A1 | 3/2005 | Tsutsui et al. | |
| 2005/0240494 A1* | 10/2005 | Cue et al. | 705/27 |
| 2006/0008239 A1* | 1/2006 | Huang et al. | 386/1 |
| 2006/0026142 A1 | 2/2006 | Ohmori et al. | |
| 2006/0036568 A1* | 2/2006 | Moore et al. | 707/1 |
| 2006/0080262 A1 | 4/2006 | Ito et al. | |
| 2006/0095974 A1 | 5/2006 | Ito et al. | |
| 2006/0230229 A1* | 10/2006 | Getzinger | 711/118 |
| 2006/0280437 A1* | 12/2006 | Logan et al. | 386/94 |
| 2008/0053293 A1* | 3/2008 | Georges et al. | 84/609 |
| 2008/0156178 A1* | 7/2008 | Georges et al. | 84/645 |

* cited by examiner

| CONTENTS EXTRACTION INFORMATION ||  PERSONAL COPYRIGHT INFORMATION |
|---|---|---|
| SEGMENTATION IDENTIFICATION INFORMATION | SEGMENT EXTRACTION INFORMATION | |
| 1 | 1 | 010 |

FIG. 3

| SEGMENT EXTRACTION INFORMATION | PROCESSING |
|---|---|
| 0 | START POSITION AND END POSITION IN VIEW SEGMENT OF PLAYLIST ARE EXTRACTED AS START POSITION AND END POSITION OF VIEWABLE PLAYLIST |
| 1 | START POSITION AND END POSITION IN VIEW RESTRICTION SEGMENT OF COPYRIGHT INFORMATION ARE EXTRACTED AS START POSITION AND END POSITION OF VIEWABLE PLAYLIST |

FIG. 4

| CONTENTS IDENTIFICATION INFORMATION | CONTENTS |
|---|---|
| A30657 | A |
| 901369 | B |
| B30894 | D |

| CONTENTS IDENTIFICATION INFORMATION | START POSITION | END POSITION |
|---|---|---|
| A30657 | 25 : 30 : 50 | 27 : 13 : 00 |
| | 00 : 00 : 00 | 03 : 30 : 00 |
| | 12 : 00 : 00 | 13 : 48 : 59 |

| CONTENTS IDENTIFICATION INFORMATION | SEGMENTATION IDENTIFICATION INFORMATION | SEGMENT NUMBER | COPYRIGHT DESIGNATED INFORMATION | | COPYRIGHT RULE INFORMATION | | | SEGMENT INFORMATION | | | |
|---|---|---|---|---|---|---|---|---|---|---|---|
| | | | | | CONNECTION | ORDER | DESIGNATION BASE | START POSITION | END POSITION | START POSITION | END POSITION |
| A30657 | 1 | 1 | 1 | 1 | 1 | 0 | 0 | 00:00:00 | 04:59:99 | 10:00:00 | 10:59:99 |
| | | 2 | 1 | 0 | 0 | 0 | 0 | 05:00:00 | 09:59:99 | 11:00:00 | 11:59:99 |
| | | 3 | 1 | 0 | 0 | 0 | 0 | 00:00:00 | 04:59:99 | 05:00:00 | 09:59:99 |
| | | 4 | 1 | 1 | 1 | 1 | 0 | 10:00:00 | 10:59:99 | 11:00:00 | 11:59:99 |
| | | 5 | 1 | 0 | 0 | 0 | 0 | 12:00:00 | 16:59:99 | 22:00:00 | 22:59:99 |
| | | 6 | 1 | 0 | 0 | 0 | 0 | 17:00:00 | 21:59:99 | 22:00:00 | 22:59:99 |
| | | 7 | 1 | 1 | 1 | 1 | 0 | 23:00:00 | 27:59:99 | 00:00:00 | 04:59:99 |
| | 2 | 1 | 1 | 0 | 0 | 0 | 0 | 00:00:00 | 09:59:99 | 12:00:00 | 21:59:99 |
| | | 2 | 0 | 1 | 0 | 1 | 0 | 00:00:00 | 09:59:99 | 23:00:00 | 27:59:99 |
| | | 3 | 1 | 0 | 0 | 0 | 0 | 00:00:00 | 09:59:99 | 10:00:00 | 10:59:99 |
| | | 4 | 1 | 0 | 0 | 0 | 0 | 12:00:00 | 21:59:99 | 22:00:00 | 22:59:99 |
| | | 5 | 1 | 1 | 1 | 1 | 0 | 10:00:00 | 10:59:99 | 00:00:00 | 09:59:99 |

FIG. 8

| CONNECTION | ORDER | DESIGNATION BASE | PROCESSING CONTENT |
|---|---|---|---|
| 0 | 0 | 0 | IT IS CONFIRMED THAT A RELATIONAL VIEW SEGMENT EXISTS JUST AFTER A VIEW RESTRICTION SEGMENT. IN CASE OF NON-EXISTING, THE RELATIONAL VIEW SEGMENT IS INSERTED JUST AFTER THE VIEW RESTRICTION SEGMENT. |
| 1 | 0 | 0 | IT IS CONFIRMED THAT A RELATIONAL VIEW SEGMENT EXISTS AFTER A VIEW RESTRICTION SEGMENT. IN CASE OF NON-EXISTING, THE RELATIONAL VIEW SEGMENT IS ADDED IN ORDER OF SEGMENTATION OF CONTENTS. |
| 0 | 0 | 1 | IT IS CONFIRMED THAT A RELATIONAL VIEW SEGMENT EXISTS JUST BEFORE A VIEW RESTRICTION SEGMENT. IN CASE OF NON-EXISTING, THE RELATIONAL VIEW SEGMENT IS INSERTED JUST BEFORE THE VIEW RESTRICTION SEGMENT. |
| 1 | 0 | 1 | IT IS CONFIRMED THAT A RELATIONAL VIEW SEGMENT EXISTS BEFORE A VIEW RESTRICTION SEGMENT. IN CASE OF NON-EXISTING, THE RELATIONAL VIEW SEGMENT IS ADDED IN ORDER OF SEGMENTATION OF CONTENTS. |
| 0 | 1 | 0 | IT IS CONFIRMED THAT A RELATIONAL VIEW SEGMENT DOES NOT EXIST JUST AFTER A VIEW RESTRICTION SEGMENT. IN CASE OF EXISTING, ANOTHER SEGMENT IS INSERTED IN ORDER OF SEGMENTATION OF CONTENTS. |
| 1 | 1 | 0 | IT IS CONFIRMED THAT A RELATIONAL VIEW SEGMENT DOES NOT EXIST AFTER A VIEW RESTRICTION SEGMENT. IN CASE OF EXISTING, THE RELATIONAL VIEW SEGMENT IS MOVED IN ORDER OF SEGMENTATION OF CONTENTS. |
| 0 | 1 | 1 | IT IS CONFIRMED THAT A RELATIONAL VIEW SEGMENT DOES NOT EXIST JUST BEFORE A VIEW RESTRICTION SEGMENT. IN CASE OF EXISTING, ANOTHER SEGMENT IS INSERTED IN ORDER OF SEGMENTATION OF CONTENTS. |
| 1 | 1 | 1 | IT IS CONFIRMED THAT A RELATIONAL VIEW SEGMENT DOES NOT EXIST BEFORE A VIEW RESTRICTION SEGMENT. IN CASE OF EXISTING, THE RELATIONAL VIEW SEGMENT IS MOVED IN ORDER OF SEGMENTATION OF CONTENTS. |

| COPYRIGHT MANAGEMENT IDENTIFICATION INFORMATION | CONTENTS IDENTIFICATION INFORMATION | SEGMENT NUMBER | COPYRIGHT DESIGNATED INFORMATION | COPYRIGHT RULE INFORMATION ||| SEGMENT INFORMATION |||||
|---|---|---|---|---|---|---|---|---|---|---|
| | | | | CONNECTION | ORDER | DESIGNATION BASE | START POSITION | END POSITION | START POSITION | END POSITION |
| K403B | A30657 | 1 | 1 | 1 | 0 | 0 | 00:00:00 | 04:59:99 | 10:00:00 | 10:59:99 |
| | | 2 | 1 | 0 | 0 | 0 | 05:00:00 | 09:59:99 | 11:00:00 | 11:59:99 |
| | | 3 | 1 | 0 | 0 | 0 | 00:00:00 | 04:59:99 | 05:00:00 | 09:59:99 |
| | | 4 | 1 | 1 | 1 | 0 | 10:00:00 | 10:59:99 | 11:00:00 | 11:59:99 |
| | | 5 | 1 | 0 | 0 | 0 | 12:00:00 | 16:59:99 | 22:00:00 | 22:59:99 |
| | | 6 | 1 | 0 | 0 | 0 | 17:00:00 | 21:59:99 | 22:00:00 | 22:59:99 |
| | | 7 | 1 | 1 | 1 | 0 | 23:00:00 | 27:59:99 | 00:00:00 | 04:59:99 |

| COPYRIGHT MANAGEMENT IDENTIFICATION INFORMATION | SEGMENTATION IDENTIFICATION INFORMATION | SEGMENT EXTRACTION INFORMATION | PERSONAL COPYRIGHT INFORMATION |
|---|---|---|---|
| K403B | 1 | 1 | 010 |

FIG. 13

| PLAYLIST MANAGEMENT IDENTIFICATION INFORMATION | PLAYLIST IDENTIFICATION INFORMATION | CONTENTS IDENTIFICATION INFORMATION | START POSITION | END POSITION |
|---|---|---|---|---|
| K403B | 1 | A30657 | 25:30:50 | 27:13:00 |
| | | | 00:00:00 | 03:30:00 |
| | | | 12:00:00 | 13:48:59 |
| 00001 | 2 | 901369 | 03:00:00 | 10:00:00 |
| A0000 | 3 | B30894 | 12:00:00 | 17:00:00 |
| | | | 04:45:57 | 05:30:50 |
| DEF99 | 4 | CBF345 | 24:03:00 | 28:00:00 |

| PLAYLIST MANAGEMENT IDENTIFICATION INFORMATION | SEGMENTATION IDENTIFICATION INFORMATION | SEGMENT EXTRACTION INFORMATION | PERSONAL COPYRIGHT INFORMATION |
|---|---|---|---|
| K403B | 1 | 1 | 010 |
| .. | | | .. |

| PLAYLIST MANAGEMENT IDENTIFICATION INFORMATION | CONTENTS IDENTIFICATION INFORMATION | START POSITION | END POSITION |
|---|---|---|---|
| K403B | A30657 | 00:00:00 | 04:59:59 |
| | | 10:00:00 | 10:59:59 |
| | | 12:00:00 | 16:59:59 |
| | | 22:00:00 | 22:59:59 |
| | | 23:00:00 | 27:59:59 |
| .. | | .. | .. |

| CONTENTS IDENTIFICATION INFORMATION | START POSITION | END POSITION |
|---|---|---|
| A30657 | 00:00:00 | 04:59:99 |
| | 10:00:00 | 10:59:99 |
| | 12:00:00 | 16:59:99 |
| | 22:00:00 | 22:59:99 |
| | 23:00:00 | 27:59:99 |

| CONTENTS IDENTIFICATION INFORMATION | START POSITION | END POSITION | DESIGNATION SEGMENT IDENTIFICATION INFORMATION |
|---|---|---|---|
| A30657 | 00:00:00 | 04:59:99 | 1 |
| | 10:00:00 | 10:59:99 | 0 |
| | 12:00:00 | 16:59:99 | 1 |
| | 22:00:00 | 22:59:99 | 0 |
| | 23:00:00 | 27:59:99 | 1 |

FIG. 24

PLAYLIST COMPOSITION APPARATUS, COPYRIGHT MANAGEMENT APPARATUS AND VIEW TERMINAL APPARATUS

CROSS-REFERENCE TO RELATED APPLICATIONS

This application is based upon and claims the benefit of priority from prior Japanese Patent Application No. 2005-185082, filed on Jun. 24, 2005, and prior Japanese Patent Application No. 2005-276729, filed on Sep. 22, 2005; the entire contents of which are incorporated herein by reference.

FIELD OF THE INVENTION

The present invention relates to a playlist composition apparatus, a copyright management apparatus and a view terminal apparatus to compose a playlist having play information of contents and to view the contents based on the playlist.

BACKGROUND OF THE INVENTION

Recently, technique to acquire contents (such as a dynamic image) using a private view terminal or a personal computer via an Internet and to view the contents is widely spread. In general, a contents holder (copywriter) who holds a copyright of such contents desires to prohibit copyright infringement (illegal copy and editing of contents). A technique to realize prohibition of such infringement is developed. For example, in a view terminal such as an AV device, a user can compose (create) a playlist describing a method to partially play contents. However, use of the playlist is restricted in this AV device.

Furthermore, another technique is proposed in Japanese Patent Disclosure (Kokai) No. 2003-50588. In this technique, a copywriter registers contents (previously constructed) to a management server, and the copywriter indicates a retrieval condition of contents. The management server selects contents matched with the retrieval condition, and composes a playlist arranging the selected contents. As a result, use of the playlist intended by the copywriter is permitted while restricting the user's editing of contents.

On the other hand, in the Internet, a community to exchange opinions and thoughts via a billboard or a chat room exists, and communication based on the contents is executed. Accordingly, without restricting use of the playlist (composed by the user) to a predetermined device, technique to share the playlist among users belonging to the community is desired.

However, in a method disclosed in above citation, a management server composes a playlist based on a copyright predetermined by the contents holder. Accordingly, for example, the management server cannot compose a playlist to view contents without CM (commercial program). As a result, a playlist having high utility for users of the view terminals cannot be composed.

Furthermore, for the purpose of prohibition of behavior that ignores a copyright and infringes Protection of Original Designs, the contents holder does not often permit distribution of the playlist. Accordingly, a user cannot view contents using a playlist composed by another user by sharing the playlist.

SUMMARY OF THE INVENTION

The present invention is directed to a playlist composition apparatus, a copyright management apparatus and a view terminal apparatus for composing a playlist reflecting both intentions of a copywriter of contents and a user viewing the contents.

According to an aspect of the present invention, there is provided a playlist composition apparatus, comprising: a playlist acquisition unit configured to acquire a playlist including a view segment of contents for a user, the view segment indicating a start position and an end position in the contents; copyright information acquisition unit configured to acquire a copyright information of the contents from a copyright management apparatus via a network, the copyright management apparatus managing copyright information of each contents; a view right information acquisition unit configured to acquire view right information of the user to view the contents; and a viewable playlist composition unit configured to compose a viewable playlist by editing the playlist using the copyright information and the view right information, the viewable playlist including restriction information of the view segment.

According to another aspect of the present invention, there is also provided a copyright management apparatus, comprising: a copyright information storage unit configured to store copyright information including segmentation information and contents identification information to uniquely identify contents, the segmentation information including at least one view restriction segment and copyright designated information, the view restriction segment indicating a start position and an end position of restricted view contents, the copyright designated information being a condition to designate the view restriction segment; a receiving unit configured to receive the contents identification information from a playlist composition apparatus via a network, the playlist composition apparatus composing a viewable playlist including the view restriction segment; a retrieval unit configured to retrieve the copyright information corresponding to the contents identification information received by said receiving unit from said copyright information storage unit; and a sending unit configured to send the copyright information retrieved by said retrieval unit to the playlist composition apparatus.

According to still another aspect of the present invention, there is also provided a view terminal apparatus, comprising: a view right information storage unit configured to store view right information describing a user's right to view contents; a sending unit configured to send playlist identification information and the view right information to another apparatus via a network, the playlist identification information uniquely identifying a playlist, the playlist including a start position and an end position of a view segment in the contents; a receiving unit configured to receive a viewable playlist sent from the another apparatus, the viewable playlist including restriction information of the view segment; and a play unit configured to play the contents based on the viewable playlist.

BRIEF DESCRIPTION OF THE DRAWINGS

FIG. 3 is a schematic diagram of data structure of a terminal view right information memory in FIG. 2.

FIG. 4 is a schematic diagram of a designation method of section extraction information.

FIG. 8 is a schematic diagram of data structure of a copyright information memory in FIG. 7.

FIG. 9 is a schematic diagram of a designation method of copyright rule information.

FIG. 12 is a schematic diagram of data structure of a copyright information memory in FIG. 10.

FIG. 13 is a schematic diagram of data structure of a playlist memory in FIG. 10.

FIG. 24 is a schematic diagram of data structure of the viewable playlist according to the second embodiment.

DETAILED DESCRIPTION OF THE EMBODIMENTS

Figure 1:
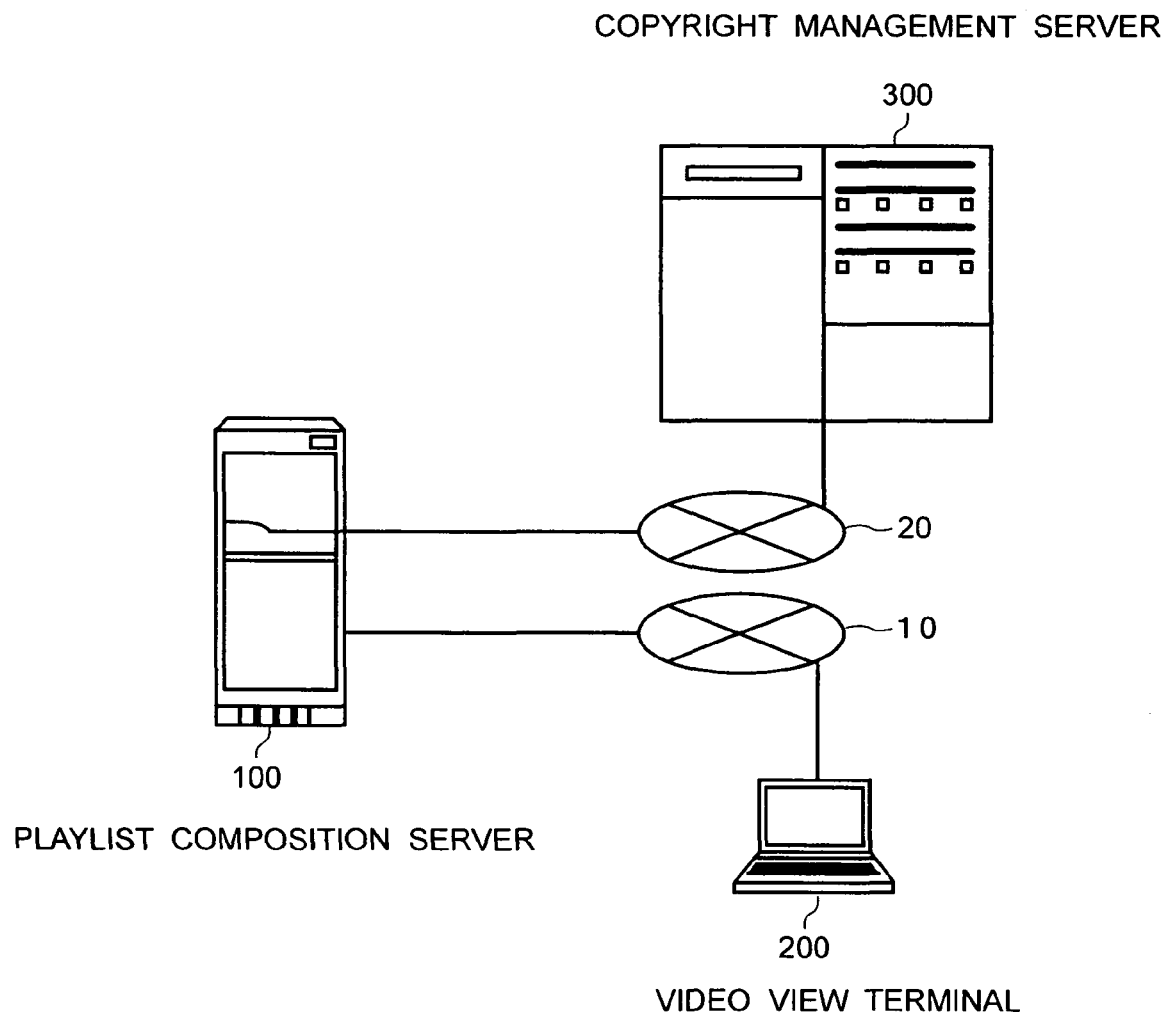
FIG. 1 is a block diagram of a contents management system according to a first embodiment.

Hereinafter, various embodiments of the present invention will be explained by referring to the drawings. The present invention is not limited to the following embodiments.

A playlist composition apparatus of the first embodiment considers copyright information previously registered in a copyright management apparatus, playlist identification information to uniquely identify a playlist composed (by a user) in a view terminal apparatus, and view right information of the user sent from the view terminal apparatus. By editing the playlist based on the copyright information, a viewable playlist is composed (created).

The playlist is view method information including a view segment as a part which a user desires to view in contents. The view segment comprises a start position and an end position of the part. The view right information is information describing the user's right (authority) to view contents. The viewable playlist is a playlist including a restricted part for the user to view in contents, i.e., a playlist including view method information restricted based on copyright related to the contents.

FIG. 1 is a block diagram of a contents management system including a playlist composition server 100 of the first embodiment. As shown in FIG. 1, the playlist composition server 100 and a video view terminal 200 are connected via a network 10, and the playlist composition server 100 and a copyright management server 300 are connected via a network 20. The network 10 and 20 may include any network forms such as the Internet or a VPN.

In the playlist composition server 100, playlist identification information and view right information are received from the video view terminal 200, and contents identification information included in a playlist corresponding to the playlist identification information, and the view right information are sent to the copyright management server 300. Furthermore, copyright information including designated rules in case of editing contents is received from the copyright management server 300, a viewable playlist is composed using a rule matched with the view right information in the copyright information, and the viewable playlist is sent to the video view terminal 200.

The video view terminal 200 is an apparatus to view contents such as video or sound, and has a function to compose a playlist including a view segment and contents identification information. In the video view terminal 200, playlist identification information and view right information are sent to the playlist composition server 100, a viewable playlist is received from the playlist composition server 100, and contents can be viewed based on the viewable playlist. Examples of the video view terminal 200 include an audio system, an AV device or a personal computer having communication function, or a mobile terminal such as a cellular-phone or a PDA.

The copyright management server 300 is an apparatus to send copyright information of contents corresponding to the contents identification information and the view right information (received from the playlist composition server 100) to the playlist composition server 100.

Figure 2:
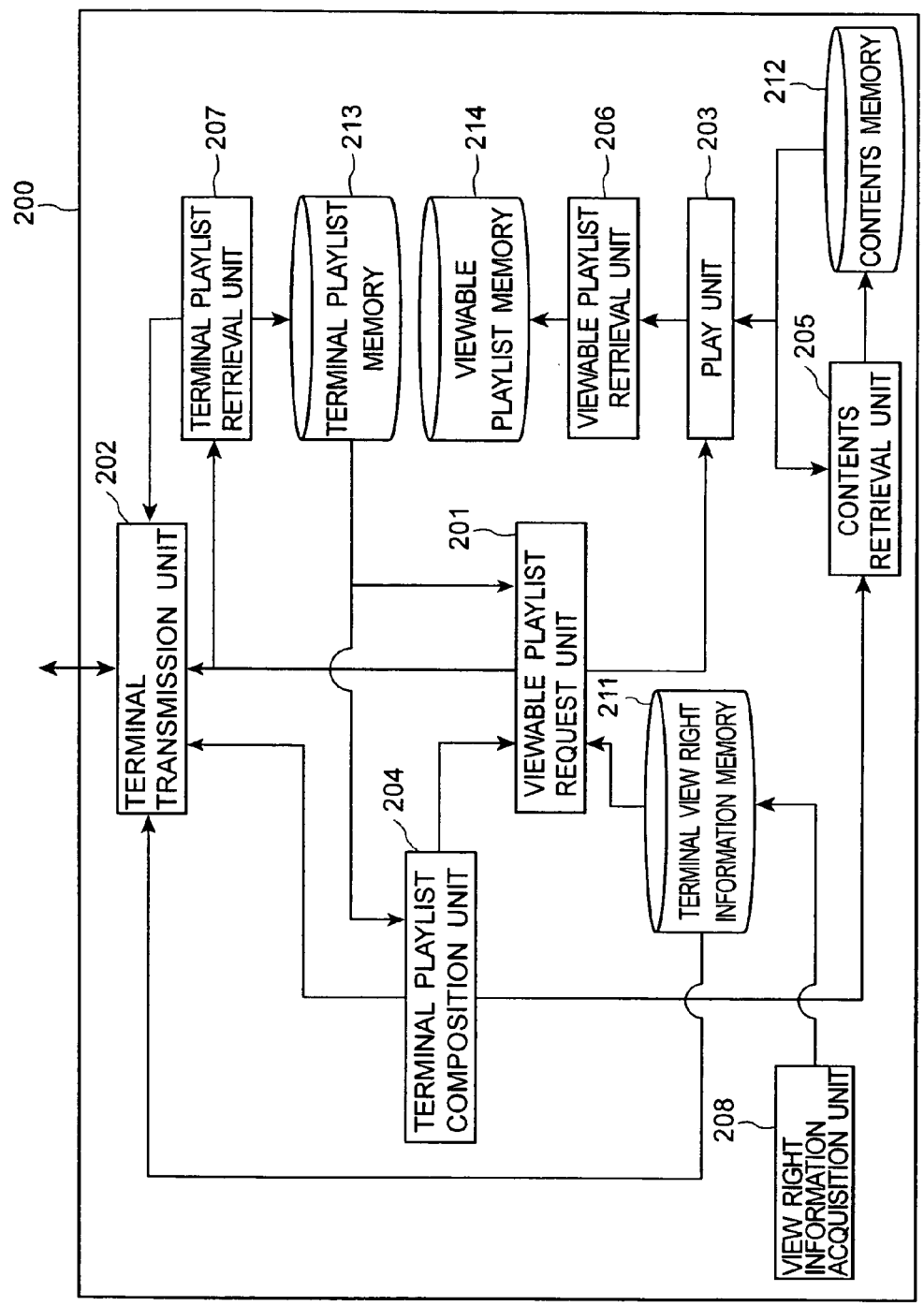
FIG. 2 is a block diagram of a video view terminal according to the first embodiment.

First, components of the video view terminal 200 of the first embodiment are explained. FIG. 2 is a block diagram of the video view terminal 200. As shown in FIG. 2, the video view terminal 200 includes a viewable playlist request unit 201, a terminal transmission unit 202, a play unit 203, a terminal playlist composition unit 204, a contents retrieval unit 205, a viewable playlist retrieval unit 206, a terminal playlist retrieval unit 207, a view right information acquisition unit 208, a terminal view right information memory 211, a contents memory 212, a terminal playlist memory 213, and a viewable playlist memory 214.

The viewable playlist request unit 201 requests composition of a viewable playlist based on a playlist managed by the playlist composition server 100. In case of requesting, view right information stored in the terminal view right information memory 211 and playlist identification information of a playlist (managed by the playlist composition server 100) are sent to the playlist composition server 100 via the terminal transmission unit 202.

The terminal transmission unit 202 sends the playlist identification information and the view right information to the playlist composition server 100 via the network 10, and receives a viewable playlist sent from the playlist composition server 100. Furthermore, the terminal transmission unit 202 sends a playlist newly composed to the playlist composition server 100 for registration.

The play unit 203 plays contents. In case of composing a viewable playlist, the contents are played based on the viewable playlist.

The terminal playlist composition unit 204 composes a playlist according to a user's indication. In the playlist, contents identification information to uniquely identify the contents (selected by the user) and a start position and an end position of a view segment (indicated by the user) are correspondingly stored. Data structure of the playlist is explained afterwards.

The contents retrieval unit 205 retrieves contents from which the user composes a playlist from the contents memory 212.

The viewable playlist retrieval unit 206 retrieves a viewable playlist from the viewable playlist memory 214. A viewable playlist (composed by the playlist composition server 100) sent to the video view terminal 200 is stored in the viewable playlist memory 214. Accordingly, without sending a composition request of the viewable playlist to the playlist composition server 100, the viewable playlist can be retrieved from the viewable playlist memory 214 by the viewable playlist retrieval unit 206 and used.

The terminal playlist retrieval unit 207 retrieves a playlist stored in the playlist composition server 100 or a playlist stored in the terminal playlist memory 213. The playlist retrieved is consulted when the terminal playlist composition unit 204 composes a new playlist.

The view right information acquisition unit 208 acquires view right information stored in a memory medium such as a flash memory or a CD-ROM (Compact Disk-Read Only Memory), and registers it to the terminal view right information memory 211. If the view right information is already registered, the view right information acquisition unit 208 updates the registered view right information by the acquired view right information. The view right information acquisition unit 208 may acquire the view right information from a contents holder via a network.

The terminal view right information memory 211 is a memory means to store view right information. The terminal view right information memory 211 can be any general memory means, such as a HDD (Hard Disk Drive), an optical disk, a memory card, or a RAM (Random Access Memory).

FIG. 3 is a schematic diagram of one example of a data structure of the terminal view right information memory 211. As shown in FIG. 3, the terminal view right information memory 211 stores view right information including contents extraction information and personal right information. The contents extraction information includes segmentation identification information and segment extraction information.

The personal copyright information is information to specify each user's right to view and edit contents. By comparing the personal copyright information with copyright designated information in the copyright information (stored in the copyright management server 300), the personal copyright information is used to decide which rule in the copyright information is designated. A method for comparing the personal copyright information with the copyright designated information is explained afterwards.

The segmentation identification information is information to uniquely identify a segmentation method of contents in the copyright information. The segmentation method is explained afterwards. The segmentation identification information is used to select one segmentation method from a plurality of segmentation methods in the copyright information. In FIG. 3, the segmentation identification information is represented by a numerical value. However, any information uniquely identifying each segmentation method can be used.

By utilizing the segmentation identification information, for example, a segmentation method to be designated can be changed based on a license fee paid by the user.

The segment extraction information is information to indicate a method for extracting the start position and the end position to output to the viewable playlist. FIG. 4 is a schematic diagram of one example of the segment extraction information. As shown in FIG. 4, "0" or "1" is represented as the segment extraction information. In case of "0", a start position and an end position of a view segment in the playlist composed by the user are extracted as a start position and an end position of the viewable playlist. In case of "1", a start position and an end position of a view segment in the copyright information are extracted as a start position and an end position of the viewable playlist.

By using the segment extraction information, for example, as for a user who paid an expensive license fee, a view segment in a playlist composed by the user is extracted as a viewable playlist. On the other hand, as for a user who paid an inexpensive license fee, a start position and an end position in the copyright information set by a copywriter is extracted as a viewable playlist.

Figures 5, 6, 7:
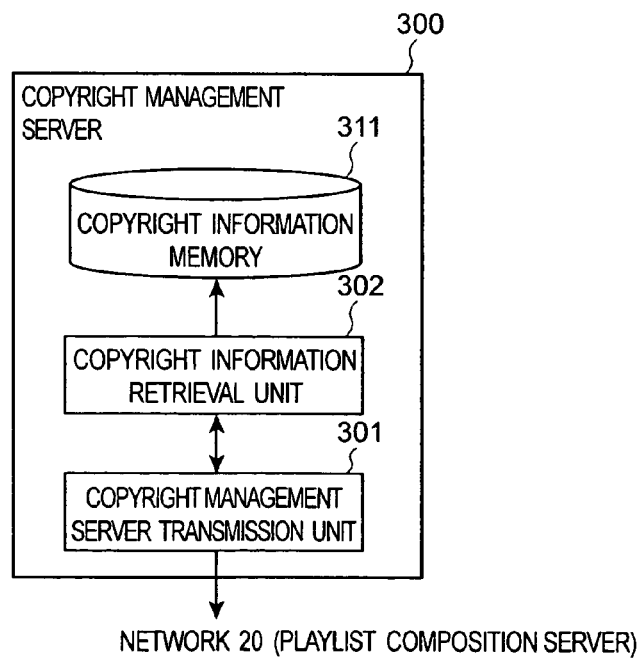
FIG. 5 is a schematic diagram of data structure of a contents memory.
FIG. 6 is a schematic diagram of data structure of a terminal playlist memory.
FIG. 7 is a block diagram of a copyright management server according to the first embodiment.

The contents memory 212 is a memory means to store contents to be viewed. The contents memory 212 can be any general memory means, such as a HDD, an optical disk, a memory card, or a RAM. FIG. 5 is a schematic diagram of one example of a data structure of the contents memory 212. As shown in FIG. 5, a contents identification information and the contents are correspondingly stored.

The contents identification information is information to uniquely identify contents. The contents are a dynamic image or a sound distributed by a contents distributor via a broadcast wave, a cable, or a memory medium. In the contents identification information, a content name may be correspondingly stored.

The terminal playlist memory 213 is a memory means to store a playlist composed by a user in the video view terminal 200. The terminal playlist memory 213 can be any general memory means, such as an HDD, an optical disk, a memory card., or a RAM.

FIG. 6 is a schematic diagram of one example of a data structure of the terminal playlist memory 213. As shown in FIG. 6, the terminal playlist memory 213 stores a playlist including contents identification information and a start position and an end position of contents. The contents identification information uniquely identifies the contents as a composition source of the playlist.

The start position and the end position represent the view segment. In FIG. 6, the start position and the end position are described by time. However, any description method identifying the start position and the end position can be used.

The viewable playlist memory 214 is a memory means to store a viewable playlist composed by the playlist composition server 100. The viewable playlist memory 214 can be any general memory means, such as an HDD, an optical disk, a memory card, or a RAM. Data structure of the viewable playlist memory 214 is the same as the terminal playlist memory 213. Accordingly, its explanation is omitted.

Next, the copyright management server 300 of the first embodiment is explained. FIG. 7 is a block diagram of the copyright management server 300. As shown in FIG. 7, the copyright management server 300 includes a copyright management server transmission unit 301, a copyright information retrieval unit 302, and a copyright information memory 311.

In the copyright management server transmission unit 301, contents identification information and view right information are received from the playlist composition server 100, and copyright information of contents corresponding to the contents identification information and the view right information is sent to the playlist composition server 100.

In the copyright information retrieval unit 302, a copyright information of contents corresponding to the contents identification information and the view right information (received by the copyright management server transmission unit 301) is retrieved from the copyright information memory 311.

The copyright information memory 311 is a memory means to store copyright information of contents. The copyright information memory 311 can be any general memory means, such as an HDD, an optical disk, a memory card, or a RAM. FIG. 8 is a schematic diagram of a data structure of the copyright information memory 311. As shown in FIG. 8, contents identification information, segmentation identification information, a segment number, copyright designated information, copyright rule information and segment information, are correspondingly stored. In FIG. 8, the segment number, the copyright designated information, the copyright rule information and the segment information are together called segmentation information.

The segment information includes two pairs of a start position and an end position. One pair of a start position and an end position is set as a base segment. The other pair of a start position and an end position is consulted in case of designating (applying) the copyright rule information (For example, it is checked whether two view segments are indicated in earlier order of play time).

The copyright rule information represents a rule to edit contents, which includes a connection, an order, and a designation base.

The connection information includes a first rule (continuous connection) that two segments (represented by the two pairs of the segment information) are continuously played, and a second rule (ordered connection) that the two segments are played in predetermined order (not continuously). The order information includes a first rule (compulsion) that another segment is compulsively played when the base segment is played, and a second rule (prohibition) that another segment is prohibited to play when the base segment is played. The designation base indicates which segment is a base segment in the two segments (represented by the two pairs of the segment information) in case of designating the connection and the order.

FIG. 9 is a schematic diagram of one example of the copyright rule information. In FIG. 9, the continuous connection is indicated in case that the connection is "0", and the ordered connection is indicated in case that the connection is "1". The compulsion is indicated in case that the order is "0", and the prohibition is indicated in case that the order is "1". Furthermore, the left side pair of two pairs (two segments) is a base segment in case that the designation base is "0", and the right side pair of two pairs (two segments) is a base segment in case that the designation base is "1"

By combining the above-three information (connection, order, designation base), eight rules can be indicated as shown in FIG. 9. For example, in case that all three information are "0", the left side pair (start position, end position) of two pairs is a view restriction segment, and the right side pair (start position, end position) of two pairs is a relational view segment. It is confirmed whether the relational view segment exists just after the view restriction segment. In case of non-existing, the relational view segment is inserted just after the view restriction segment.

The view restriction segment is a base segment (indicated by the designation base) as an execution object of the order in two segments included in the segment information. Concretely, this is the start position and the end position of a part indicated by the copywriter as a view restriction part for the user in the contents.

The relational view segment is a segment except for the view restriction segment in two segments (two pairs), which is related to the view restriction segment. Concretely, this is the start position and the end position of a part indicated by the copywriter as a part to view with the view restriction segment or a part prohibited to view with the view restriction segment.

In FIG. 8, the copyright designated information is information to decide the copyright rule information to be designated. By comparing with the personal copyright information, the copyright designated information is used to decide which rule (copyright rule information) is designated for each user. In the example of FIG. 8, the copyright designated information is represented by three places numerical. However, the number of places of the copyright designated information is not limited to this.

Comparison between the copyright designated information and the personal copyright information is executed as follows. A logical product between each place of the copyright designated information and each place of the personal copyright information is calculated. If the sum of the logical product is not below "1", these two information are decided to match, and the copyright rule information corresponding to the copyright designated information is designated.

As mentioned-above, by prescribing the copyright designated information, for example, the copyright rule information to be designated can be changed based on a license fee paid by the user. Concretely, the copyright rule information and the copyright designated information are defined as shown in FIG. 8. For example, if the personal copyright information "001" is assigned to a user whose license fee is high, the copyright rule information of segment numbers "4" and "7" corresponding to the copyright designated information having the third place "1" is designated to the user. Furthermore, if the personal copyright information "100" is assigned to a user whose license fee is low, the copyright rule information of all segment numbers corresponding to the copyright designated information having the first place "1" is designated to the user.

The segment number is information to uniquely identify each segment in segmentation of contents. In FIG. 8, continuous numbers from "1" are used.

The segmentation identification information is information to uniquely identify a segmentation method of the contents, which includes the segment information, the copyright rule information, the copyright designated information and the segment number. In FIG. 8, continuous numbers from "1" are used.

Figure 10:
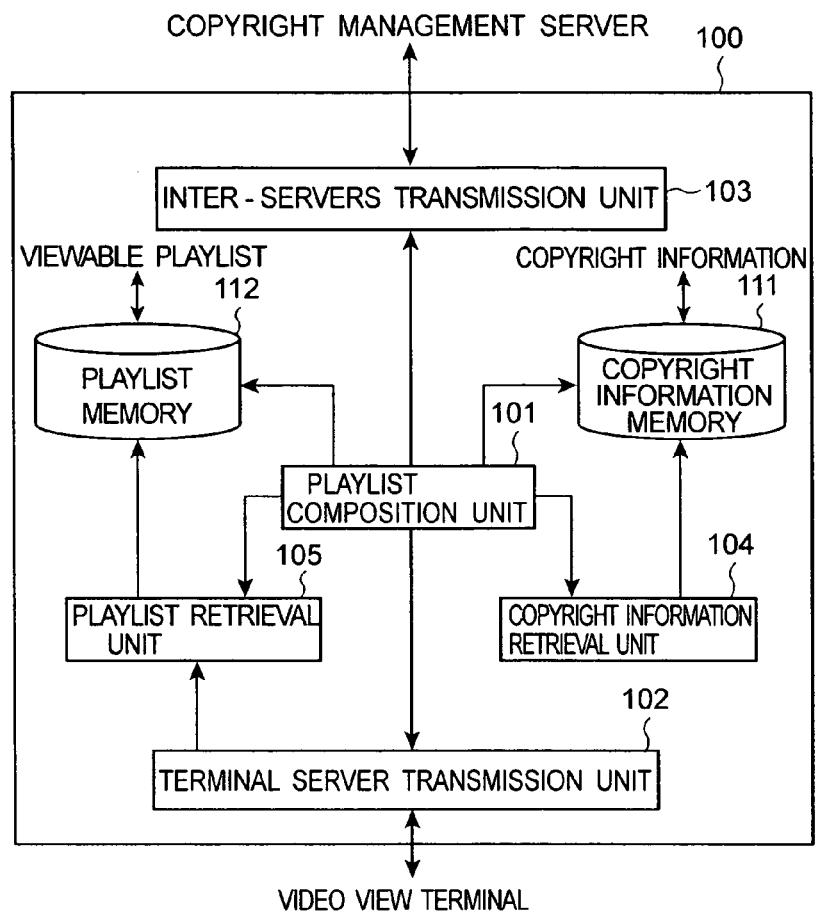
FIG. 10 is a block diagram of a playlist composition server according to the first embodiment.

Next, the playlist composition server 100 of the first embodiment is explained. FIG. 10 is a block diagram of the playlist composition server 100. As shown in FIG. 10, the playlist composition server 100 includes a playlist composition unit 101, a terminal server transmission unit 102, an inter-servers transmission unit 103, a copyright information retrieval unit 104, a playlist retrieval unit 105, a copyright information memory 111, and a playlist memory 112.

In the playlist composition unit 101, based on playlist identification information and view right information received from the video view terminal 200 via the network 10 and copyright information received from the copyright management server 300 via the network 20, a viewable playlist is composed. A method for composing the viewable playlist is explained afterwards.

Figure 11:
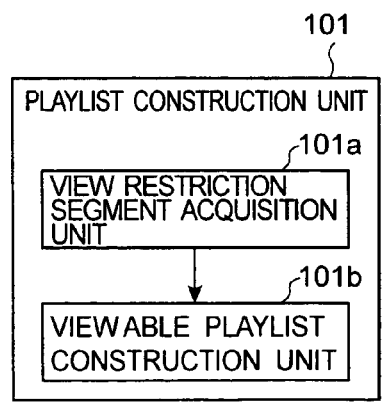
FIG. 11 is a block diagram of a playlist composition unit in FIG. 10.

FIG. 11 is a block diagram of the playlist composition unit 101. As shown in FIG. 11, the playlist composition unit 101 includes a view restriction segment acquisition unit 101a and a viewable playlist composition unit 101b.

In the view restriction segment acquisition unit 101a, from the segment information included in the copyright information received by the inter-servers transmission unit 103, a view restriction segment corresponding to the personal copyright information in the view copyright information is acquired.

In the viewable playlist composition unit 101b, as for a view segment corresponding to the view restriction segment (acquired by the view restriction segment acquisition unit 110a) in view segments included in a playlist composed by a user, the copyright rule information included in the copyright information is designated. For example, a start position and an end position of a segment restricted for the user to view is composed, and a viewable playlist is composed by combining the start position and the end position with the contents identification information.

In the terminal server transmission unit 102, playlist identification information and view copyright information are received from the video view terminal 200, and a viewable playlist composed by the playlist composition unit 101 is sent to the video view terminal 200. Furthermore, when a retrieval request of a playlist sent from the video view terminal 200 is received, the playlist (retrieved by the playlist retrieval unit 105) based on the retrieval request is sent to the video view terminal 200.

In the inter-servers transmission unit 103, contents identification information and view copyright information are sent to the copyright management server 300, and copyright information of contents corresponding to the contents identification information and the view right information is received from the copyright management server 300.

In the copyright information retrieval unit 104, as for contents of which viewable playlist is requested and corresponding to the view right information received from the video view terminal 200, a copyright information of the contents is retrieved from the copyright information memory 111.

In the playlist retrieval unit 105, a viewable playlist corresponding to the playlist identification information and the view right information (received from the video view terminal 200) is retrieved from the playlist memory 112.

The copyright information memory 111 is a memory means to store copyright information received by the copyright management server 300. The copyright information memory 111 can be any general memory means, such as an HDD, an optical disk, a memory card, or a RAM.

FIG. 12 is a schematic diagram of one example of a data structure of the copyright information memory 111. As shown in FIG. 12, the copyright information memory 111 includes a first table storing the copyright information sent by the copyright management server 300 and a second table storing the view right information sent by the video view terminal 200. Copyright management identification information corresponds to those tables to each other to uniquely identify the copyright information. In this case, the copyright information may be stored by a file except for a database.

In the first table, copyright management identification information, contents identification information, a segment number, copyright designated information, copyright rule information, and segment information are correspondingly stored. In the second table, the copyright management identification information, segmentation identification information, segment extraction information, and personal copyright information are correspondingly stored.

The copyright information memory 111 in the playlist composition server 100 is different from the copyright information memory 311 in the copyright management server 300 because of adding the copyright management identification information and deleting the segmentation identification information. Other elements are the same as the copyright management server 300. Accordingly, its explanation is omitted.

The copyright management identification information is an identifier to correspond with a playlist stored in the playlist memory 112.

The reason why the segmentation identification information is deleted from the copyright information memory 111 is as follows. In case of acquiring the copyright information from the copyright management server 300, contents identification information and view right information of the user are sent to the copyright management server 300, and copyright information corresponding to the segmentation identification information included in the view right information is received from the copyright management server 300. Accordingly, the segmentation identification information is not necessary in the copyright information memory 111.

The playlist memory 112 is a memory means to store a viewable playlist composed by the playlist composition unit 101. The playlist memory 112 can be any general memory means, such as an HDD, an optical disk, a memory card, or a RAM.

In the playlist memory 112, playlist management identification information newly assigned in case of receiving a request to compose a viewable playlist, a playlist composed by a user, view right information of the user, and a viewable playlist composed are correspondingly stored. The stored information is consulted when another user requests composition of a viewable playlist. If a viewable playlist satisfying the condition is already stored, that viewable playlist is retrieved from the playlist memory 112, and sent to the video view terminal 200. As a result, the burden to compose the viewable playlist can be reduced.

FIG. 13 is a schematic diagram of one example of a data structure of the playlist memory 112. As shown in FIG. 13, in the playlist memory 112, a first table storing a playlist sent by a user, a second table storing view right information sent by the user, and a third table storing a viewable playlist composed are included. Playlist management identification information corresponds with those tables to each other to uniquely identify the viewable playlist.

The playlist management identification information corresponds to the copyright management identification information in the copyright information memory 111. In the first embodiment, common identification information is assigned. Furthermore, the playlist, the view right information, and the viewable playlist may be stored in one table without the playlist management identification information.

Next, in the contents management system of the first embodiment, processing of composition request, and composition and receiving of a viewable playlist are explained.

In the first embodiment, a playlist newly composed by the video view terminal 200 is sent to the playlist composition server 100, and stored by adding playlist identification information in the playlist memory 112 of the playlist composition server 100. Furthermore, in case of composing a viewable playlist, the existing playlist received from the playlist composition server 100 is displayed on the video view terminal 200, and a user selects a playlist from the existing playlists displayed. By sending playlist identification information of the playlist selected to the playlist composition server 100, a viewable playlist is composed.

When a playlist is newly composed and sent to the playlist composition server 100, the viewable playlist may be composed. In this case, the video view terminal 200 cannot send the playlist identification information. Accordingly, after the video view terminal 200 sends a playlist newly composed, and after the playlist composition server 100 assigns playlist identification information to the playlist, a viewable playlist is composed.

Figure 14:
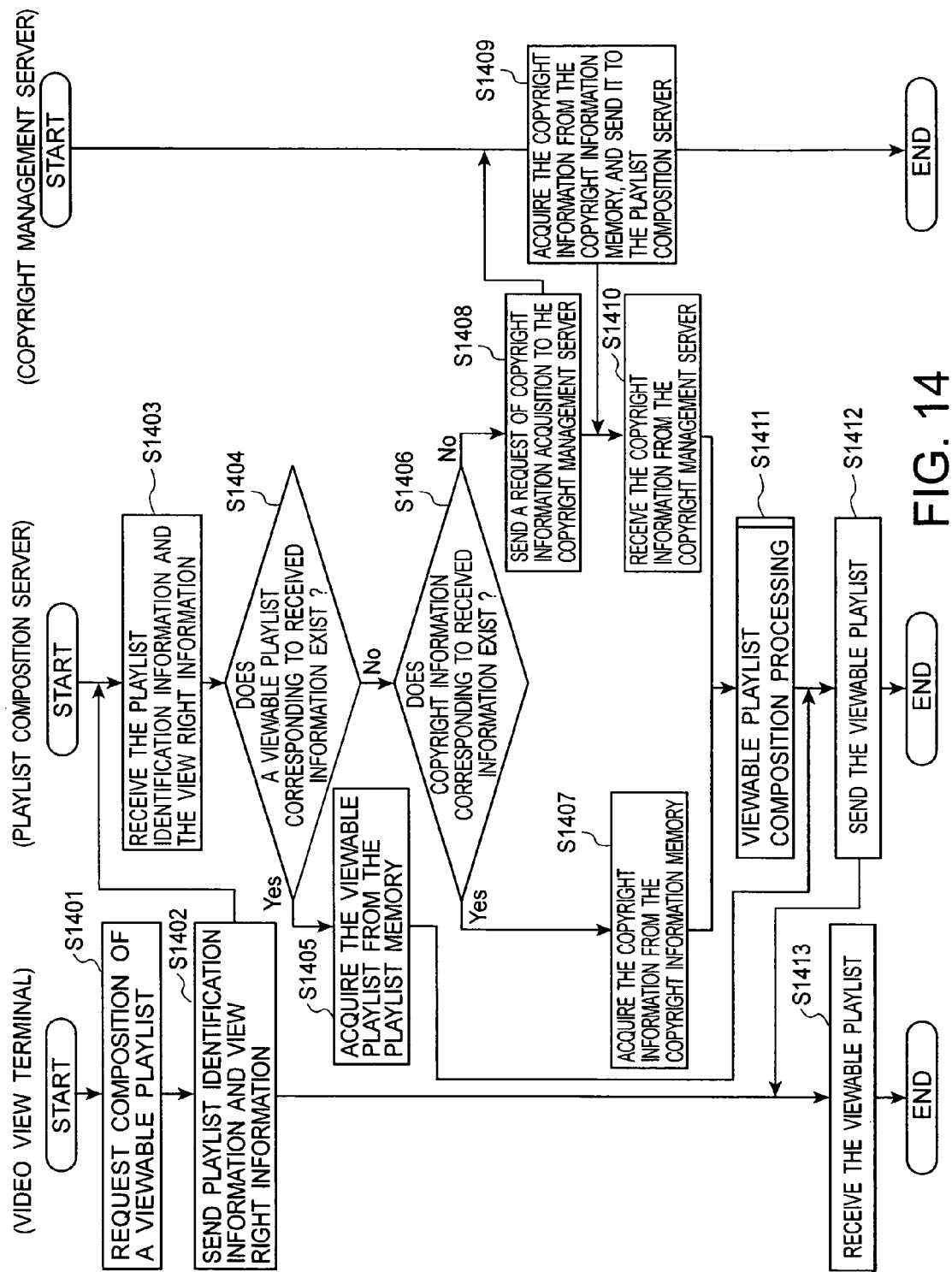
FIG. 14 is a flow chart of entire processing of the contents management system according to the first embodiment.

FIG. 14 is a flow chart of the processing of a composition request, and composition and receiving of a viewable playlist according to the first embodiment. First, in the video view terminal 200, as for a playlist selected by a user from the existing playlists displayed, the viewable playlist request unit 201 requests composition of a viewable playlist (S1401). Next, the terminal transmission unit 202 sends playlist identification information (ID number) of the playlist (selected) and view right information (acquired from the terminal view right information memory 211) to playlist composition server 100 (S1402).

Furthermore, if a playlist is newly composed and a viewable playlist is composed at the same time, the terminal transmission unit 202 sends the playlist and view right information to the playlist composition server 100. The playlist identification information is assigned by the playlist composition server 100.

Next, in the playlist composition server 100, the terminal server transmission unit 102 receives the playlist identification information and the view right information sent by the terminal transmission unit 202 of the video view terminal 200 (S1403). Continually, the playlist retrieval unit 105 decides whether a viewable playlist corresponding to the playlist identification information and the view right information received is already stored in the playlist memory 112 (S1404).

For example, in the playlist composition server 100, assume that information shown in FIG. 13 is stored in the playlist memory 112, and playlist identification information "1" and the view right information shown in FIG. 3 are received from the video view terminal 200. In this case, as shown in FIG. 13, a viewable playlist of which playlist identification information is "1" (playlist management identification information is "K403B") is already stored. Accordingly, the viewable playlist is decided to exist.

In case of deciding that the viewable playlist exists (Yes at S1404), the playlist retrieval unit 105 acquires the viewable playlist from the playlist memory 112 (S1405). In this way, by utilizing the viewable playlist already composed, the burden to compose the viewable playlist can be reduced.

In case of deciding that the viewable playlist does not exist (No at S1404), the copyright information retrieval unit 104 decides whether a copyright information corresponding to the playlist identification information and the view right information is already stored in the copyright information memory 111 (S1406).

For example, in the playlist composition server 100, assume that the information shown in FIG. 12 is stored in the copyright information memory 111, the information shown in FIG. 13 is stored in the playlist memory 112, and a playlist identification information "1" and the view right information shown in FIG. 3 are received from the video view terminal 200. In this case, from the playlist information shown in FIG. 13, the contents identification information of contents having the playlist identification information "1" is "A30657". As copyright information having contents identification information "A30657" and matched with the view right information shown in FIG. 3, the copyright information having copyright (playlist) management identification information "K403B" is already stored. Accordingly, the (corresponding) copyright information is decided to exist.

In case of deciding that the copyright information exists (Yes at S1406), the copyright information retrieval unit 104 acquires the copyright information from the copyright information memory 111 (S1407). In this way, by utilizing the copyright information already stored, the burden to send/receive information for the copyright management server 300 can be reduced.

In case of deciding that the copyright information does not exist (No at S1406), the inter-servers transmission unit 103 sends a request to acquire copyright information to the copyright management server 300 (S1408). Concretely, the contents identification information and the view right information are sent to the copyright management server 300.

Next, in the copyright management server 300, the copyright management server transmission unit 301 receives the contents identification information and the view right information (sent from the inter-servers transmission unit 103 of the playlist composition server 100), acquires copyright information corresponding to the contents identification information and the view right information from the copyright information memory 311, and sends the copyright information to the playlist composition server 100 (S1409).

For example, in the copyright management server 300, assume that the copyright information shown in FIG. 8 is stored in the copyright information memory 311, and contents identification information "A30657" and the view right information shown in FIG. 3 are received from the playlist composition server 100. In this case, the segmentation identification information included in the view right information is "1". Accordingly, in the copyright information having contents identification information "A30657" stored in the copyright information memory 311, a part of the copyright information having segmentation identification information "1" is sent to the playlist composition server 100.

Furthermore, by receiving contents identification information only from the inter-servers transmission unit 103 of the playlist composition server 100, all copyright information corresponding to the contents identification information may be sent to the playlist composition server 100. In this case, the copyright information memory 111 of the playlist composition server 100 needs data structure storing the segmentation identification information.

Next, in the playlist composition server 100, the inter-servers transmission unit 103 receives the copyright information sent from the copyright management server transmission unit 301 of the copyright management server 300 (S1410).

After acquiring the copyright information from the copyright information memory 111 (S1407) or after receiving the copyright information from the copyright management server transmission unit 301 (S1409), the playlist composition unit 101 composes a viewable playlist (S1411). Composition processing of the viewable playlist is explained afterwards.

After composing the viewable playlist, the terminal server transmission unit 102 sends the viewable playlist to the video view terminal 200 (S1412).

Next, in the video view terminal 200, the terminal transmission unit 202 receives the viewable playlist sent by the terminal server transmission unit 102 of the playlist composition server 100 (S1413), and processing of the composition request, and composition and receiving of the viewable playlist is completed.

Hereinafter, in the video view terminal 200, the viewable playlist is stored in the viewable playlist memory 214, and can be used. Furthermore, the play unit 203 can play contents according to the viewable playlist.

Figure 15:
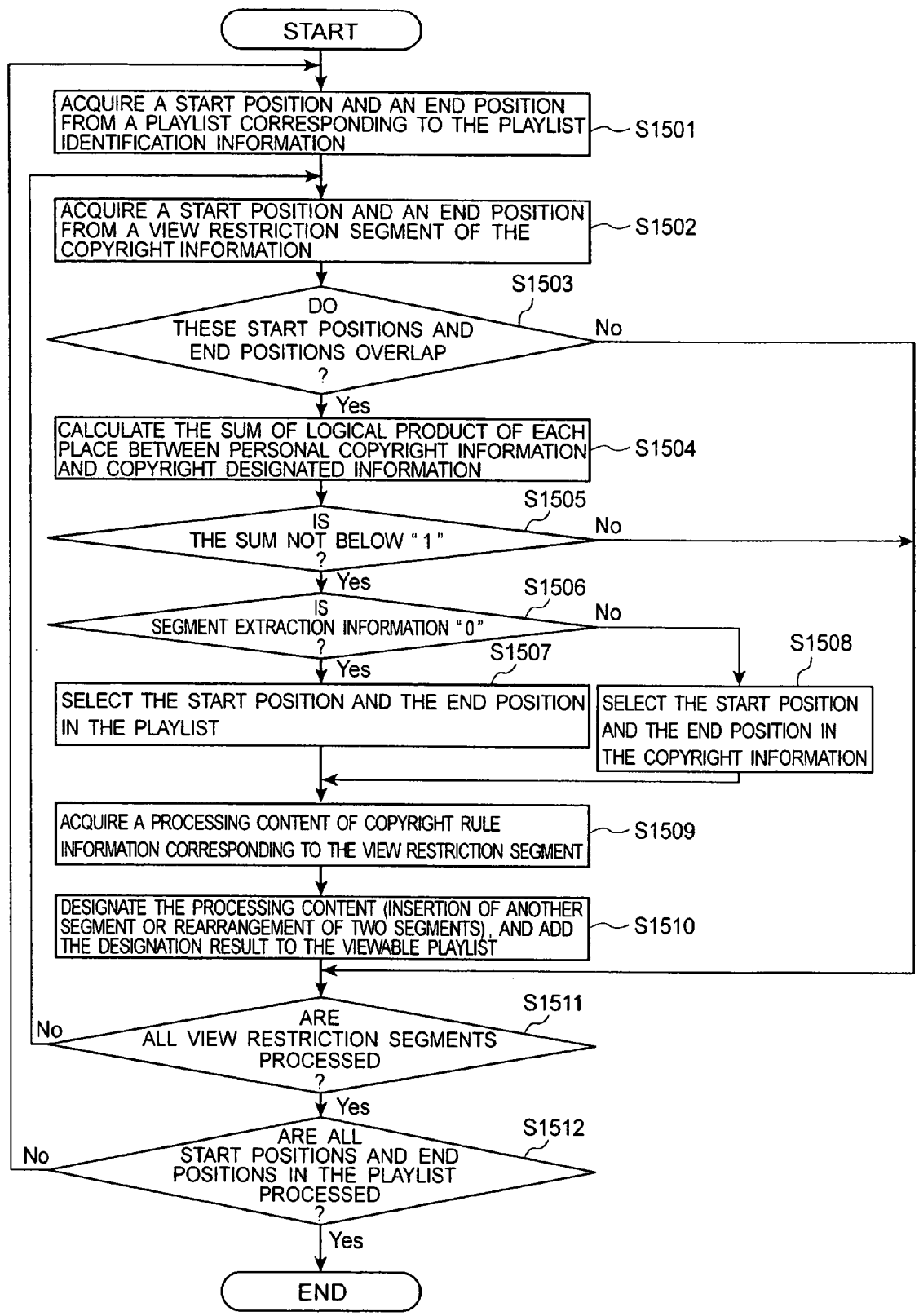
FIG. 15 is a flow chart of composition processing of a viewable playlist according to the first embodiment.

Next, composition processing of the viewable playlist at S1411 is explained in detail. FIG. 15 is a flow chart of the composition processing of the viewable playlist according to the first embodiment.

First, the viewable playlist composition unit 101*b* acquires a first start position and a first end position from a playlist corresponding to the playlist identification information received (S1501). For example, in the playlist shown in FIG. 6, "25:30:50" and "27:13:00" are acquired as the first start position and the first end position.

Next, the viewable playlist composition unit 101*b* acquires a first start position and a first end position from a view restriction segment in the copyright information (S1502). For example, in the copyright information shown in FIG. 12, "00:00:00" and "04:59:99" are acquired as the first start position and the first end position. In this case, based on the designation base ("0" or "1"), a start position and an end position are extracted from the left side pair or the right side pair of the segment information. In FIG. 12, the designation base is "0". Accordingly, the start position and the end position are extracted from the left side pair.

Next, the viewable playlist composition unit 101*b* decides whether a start position and an end position acquired at S1501 overlap with a start position and an end position acquired at S1502 (S1503). In this case, the overlap means not only two segments represented by two start positions and two end positions are perfectly matched, but also the two segments are partially matched.

If it is decided that the two segments do not overlap (No at S1503), a rule of copyright information corresponding to this segment need not be designated. Accordingly, it is decided whether all segment information are processed (S1511).

In FIG. 13, a start position and an end position acquired from a playlist are "25:30:50" and "27:13:00". On the other hand, in FIG. 12, a start position and an end position acquired from copyright information are "00:00:00" and "04:59:99". Accordingly, these two segments do not overlap. In FIG. 12, as for a start position and an end position ("23:00:00" and "27:59:99") corresponding to a segment number "7", these two segments overlap first. Accordingly, processing of S1502, S1503, and S1511 are repeated till then.

If it is decided that the two segments overlap (Yes at S1503), the view restriction segment acquisition unit 101*a* calculates a sum of logical products of each place between personal copyright information included in view right information (received by the terminal server transmission unit 102) and a copyright designated information corresponding to the view restriction segment acquired (S1504).

For example, if the personal copyright information is "010" and the copyright designated information is "111", a logical product of first place is "1", a logical product of second place is "1", and a logical product of third place is "0". As a result, the sum of logical products of each place is "1".

Next, the view restriction segment acquisition unit 101*a* decides whether the sum is not below "1" (S1505). If the sum is below "1" (No at S1505), a rule of copyright information corresponding to this segment need not be designated. Accordingly, it is decided whether all segment information are processed (S1511).

If the sum is not below "1" (Yes at S1505), the view restriction segment acquisition unit 101*a* decides whether segment extraction information included in the view right information (received by the terminal server transmission unit 102 at S1403) is "0" (S1506).

If the segment extraction information is "0" (Yes at S1506), the view restriction segment acquisition unit 101*a* sets a start position and an end position of a view segment indicated by the playlist as a start position and an end position of a viewable playlist (S1507).

If the segment extraction information is not "0" (No at S1506), the view restriction segment acquisition unit 101*a* sets a start position and an end position of a view restriction segment described in the copyright information as a start position and an end position of a viewable playlist (S1508).

Next, the viewable playlist construction unit 101*b* acquires a processing content in a copyright rule information corresponding to a view restriction segment being processed (S1509). For example, a connection, an order, and a designation base in the copyright rule information corresponding to the view restriction segment are acquired. Based on these values, the processing contents shown in FIG. 9 are acquired.

For example, in FIG. 12, when a view restriction segment ("23:00:00" and "27:59:99") corresponding to a segment number "7" is processed, the connection "1", the order "1" and the designation base "0" are acquired as the copyright rule information. The acquired processing content corresponding to these values, as shown in FIG. 9, is "It is confirmed that a relational view segment does not exist after a view restriction segment. In case of existing, the relational view segment is moved in order of segmentation of contents".

Next, the processing content of FIG. 7 is executed (designated). For example, the viewable playlist composition unit 101*b* executes insertion or rearrangement of a relational view segment, and adds the relational view segment to the viewable playlist (S1510).

For example, in FIG. 12, as for a view restriction segment ("23:00:00" and "27:59:99") corresponding to a segment number "7", assume that the processing content "It is confirmed that a relational view segment does not exist after a view restriction segment. In case of existing, the relational view segment is moved in order of segmentation of contents." is acquired. In this case, the relational view segment is "00:00:00" and "04:59:99" described at the right side of the view restriction segment. In this case, as shown in a playlist of FIG. 6, the second segment is "00:00:00" and "03:30:00" overlapped with the relational view segment. Accordingly, based on the processing content of FIG. 9, the first segment and the second segment are rearranged by replacing, and added to the viewable playlist.

Next, the viewable playlist composition unit 101*b* decides whether all view restriction segments are processed (S1511). If all view restriction segments are not processed (No at S1511), the next view restriction segment is acquired, and the processing is repeated (S1502).

If all view restriction segments are already processed (Yes at S1511), the viewable playlist construction unit 101*b* decides whether all start positions and end positions in the playlist are processed (S1512).

If all start positions and end positions are not processed (No at S1512), the next start position and end position are acquired and the processing is repeated (S1501).

If all start positions and end positions are already processed (Yes at S1512), composition processing of the viewable playlist is completed.

Next, a viewable playlist composition screen, a viewable playlist display screen, and a playlist composition screen are explained. First, on the assumption to compose a viewable playlist, a playlist is composed on the video view terminal 200. In this case, the playlist composition screen is displayed.

Figure 16:
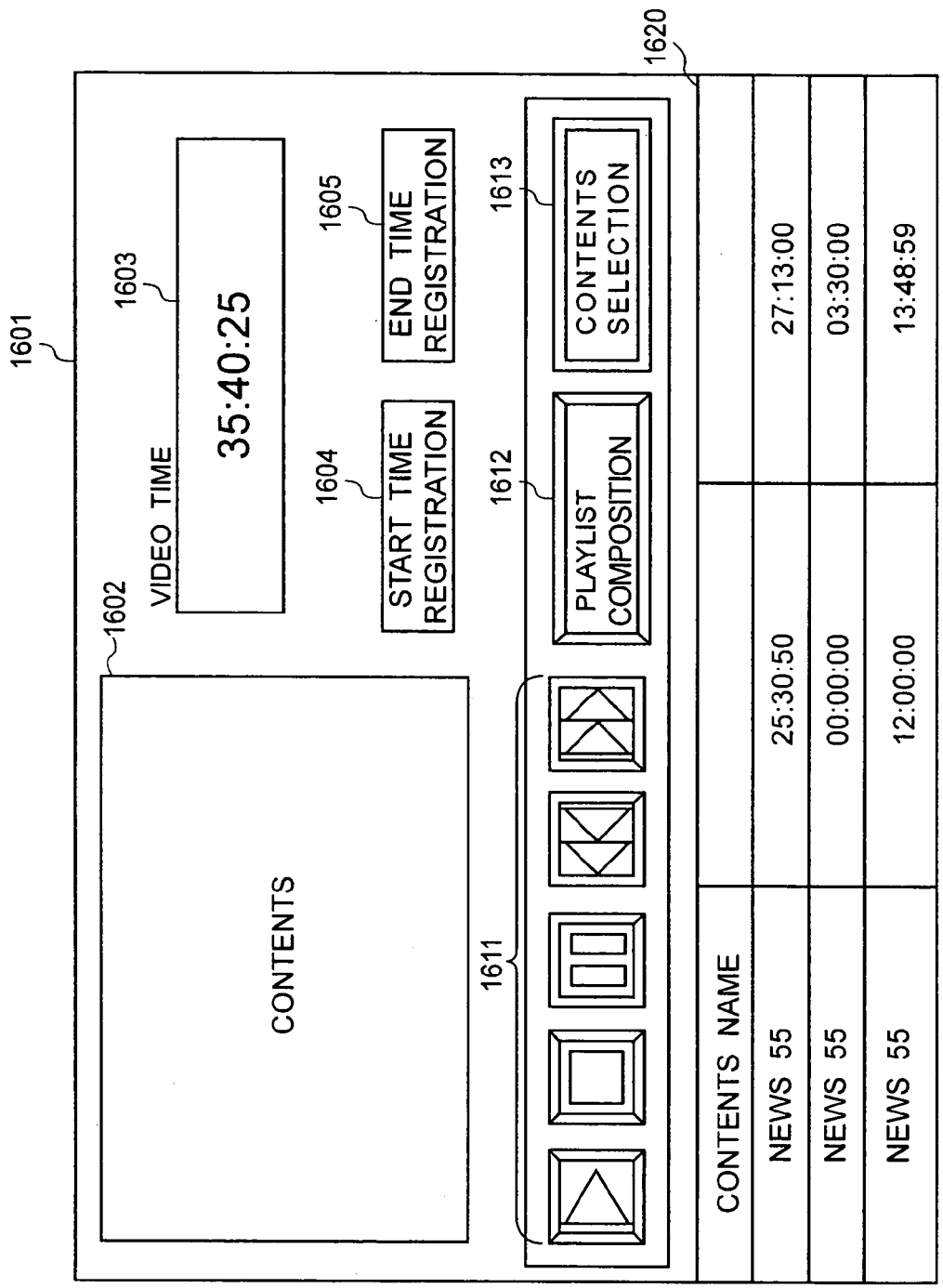
FIG. 16 is a schematic diagram of one example of a playlist composition screen.

FIG. 16 is a schematic diagram of one example of the playlist composition screen. As shown in FIG. 16, the playlist composition screen 1601 includes a contents display area 1602, a video time area 1603 of play time of contents, a start time registration button 1604, an end time registration button 1605, operation buttons 1611 of play/stop/pause/rewind/forward, a playlist composition button 1612, a contents selection button 1613, and a playlist display area 1620.

In case of composing a playlist, first, by clicking the contents selection button 1613, a contents selection screen (explained afterwards) is displayed, and contents as a composition source of playlist are selected from the contents selection screen. Next, a cursor is moved to a first frame (start time) of a segment to be extracted by the operation button 1611. By clicking the start time registration button 1604, a start time is registered. In the same way, the cursor is moved to a second frame (end time) of the segments by the operation button 1611. By clicking the end time registration button 1605, an end time is registered. This operation is repeated for each segment to be extracted. After completing extraction of all segments, by clicking the playlist composition button 1612, a playlist is composed and stored in the terminal playlist memory 213. In case that a playlist is composed from extracted segments of FIG. 16 and stored in the terminal playlist memory 213, this playlist is shown in FIG. 6.

Figure 17:
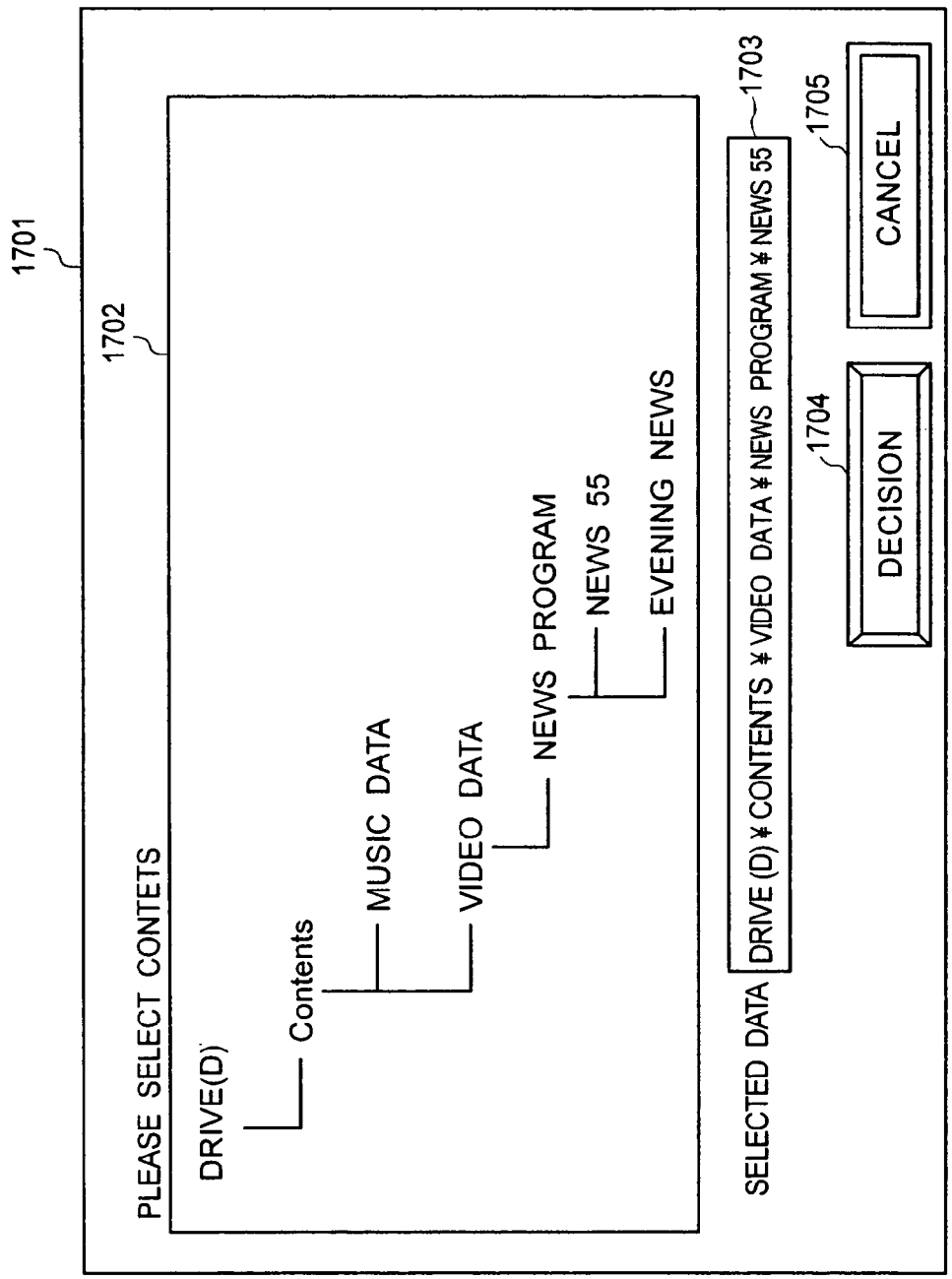
FIG. 17 is a schematic diagram of one example of a contents selection screen.

FIG. 17 is a schematic diagram of one example of the contents selection screen. As shown in FIG. 17, the contents selection screen 1701 includes a display area 1702 to hierarchically display stored contents, a selection data display area 1703, a decision button 1704, and a cancel button 1705.

By selecting contents on the display area 1702 and clicking the decision button 1704, the contents from which a playlist is composed is decided. By clicking the cancel button 1705, the processing is returned to the playlist composition screen.

Figure 18:
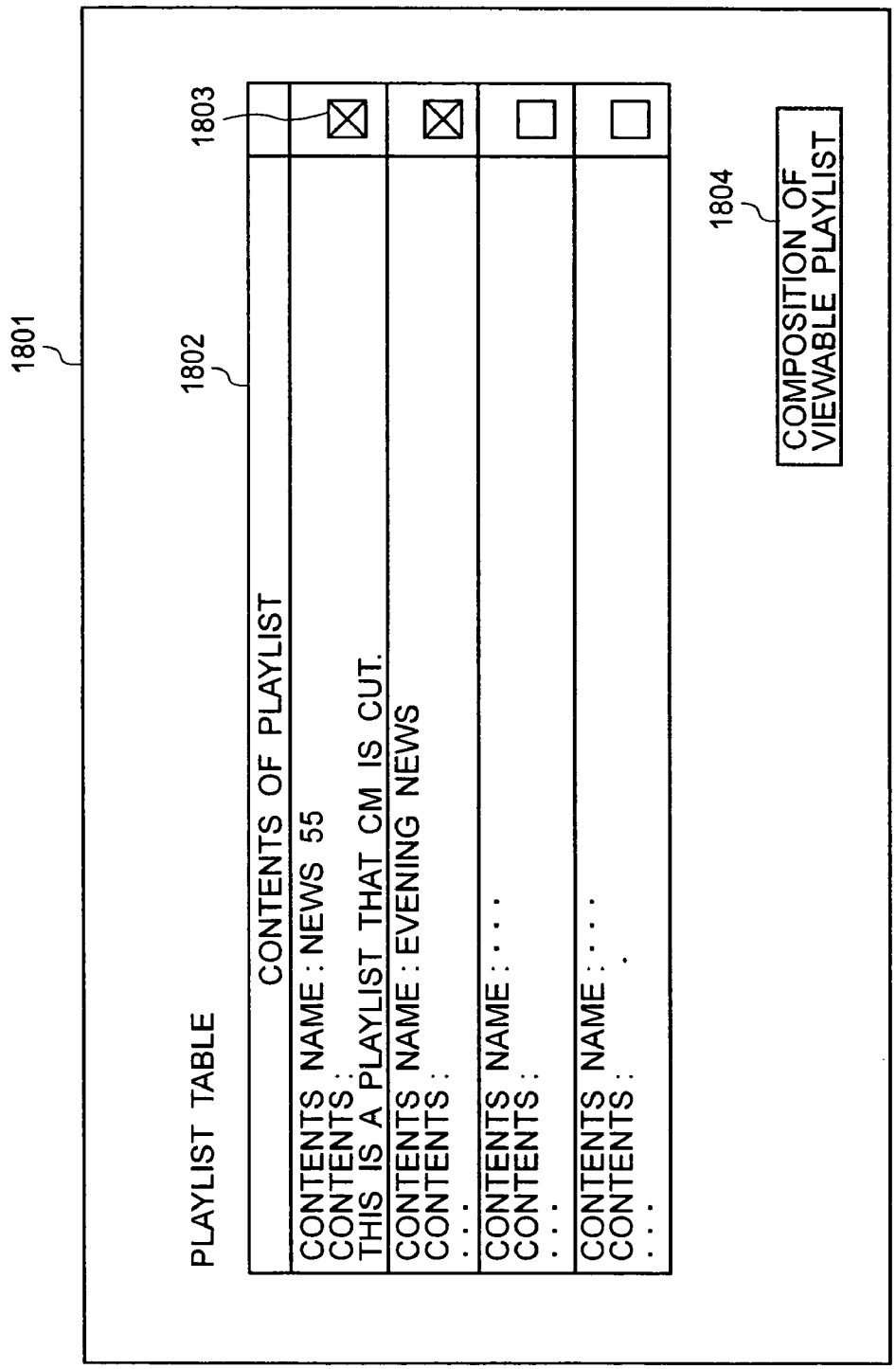
FIG. 18 is a schematic diagram of one example of a viewable playlist composition screen.

Next, in the video view terminal 200, the viewable playlist composition screen to select a playlist as a composition source of a viewable playlist and indicate composition of the viewable playlist is explained. FIG. 18 is a schematic diagram of one example of the viewable playlist composition screen.

As shown in FIG. 18, the viewable playlist composition screen 1801 includes a playlist contents display area 1802 to display the existing playlist received from the playlist composition server 100, a check box 1803 to indicate selection of playlist, and a viewable playlist composition button 1804 to request composition of viewable playlist for the playlist composition server 100.

By confirming contents of the playlist displayed, a user checks the check box 1803 of a playlist that the user desires to compose a viewable playlist, and clicks the viewable playlist composition button 1804. In this way, the viewable playlist of the playlist checked by the user is composed.

Figure 19:
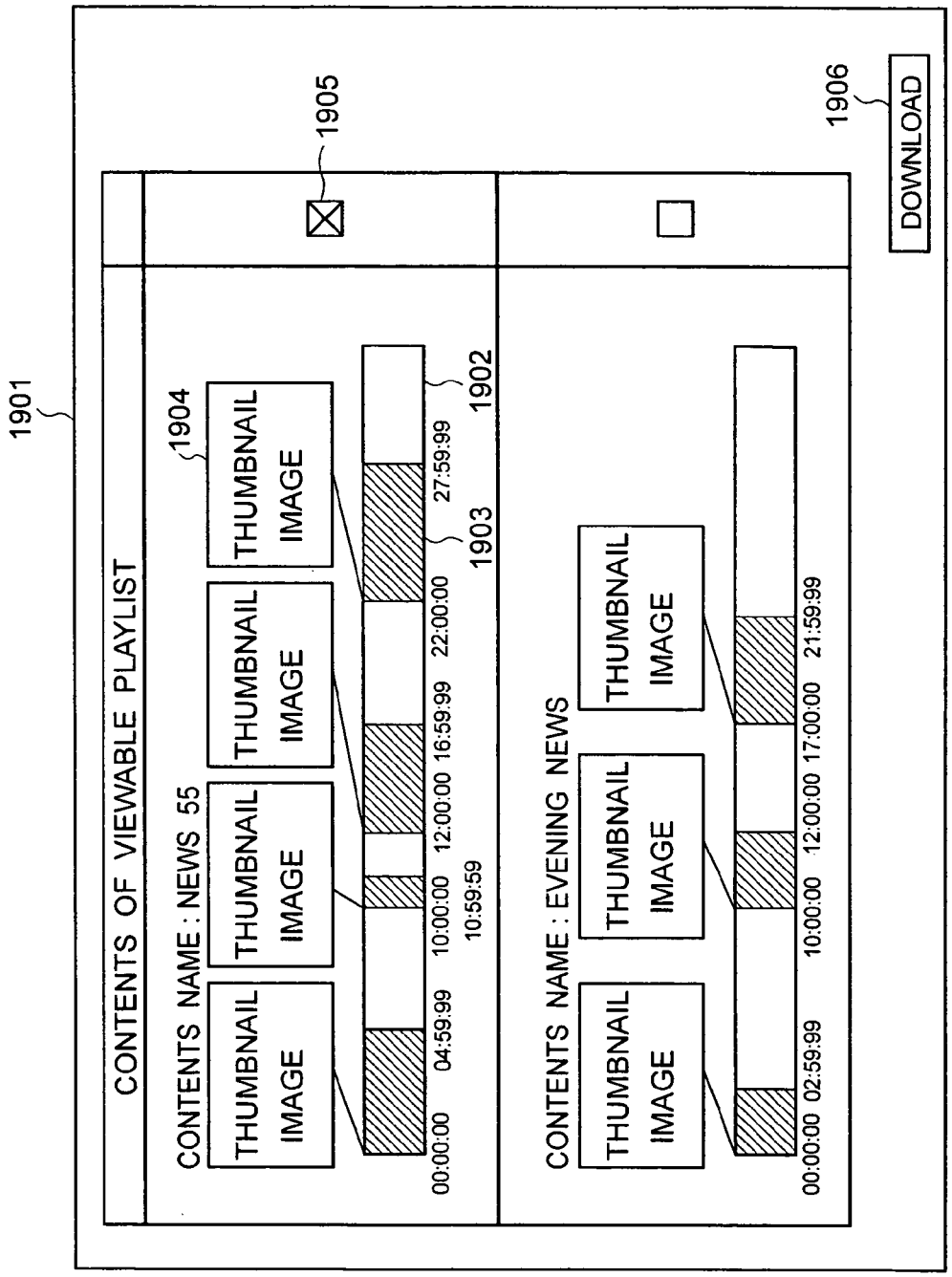
FIG. 19 is a schematic diagram of one example of a viewable playlist display screen.

Next, the viewable playlist display screen to display a viewable playlist composed by the playlist composition server 100 is explained. FIG. 19 is a schematic diagram of one example of the viewable playlist display screen on the video view terminal 200.

On the viewable playlist display screen, after sending a composition request of a viewable playlist through the viewable playlist composition screen, by receiving the viewable playlist composed by the playlist composition server 100, contents of the viewable playlist are displayed.

As shown in FIG. 19, the viewable playlist display screen 1901 includes a play segment display area 1902 to display all play segments of contents, a viewable segment display area 1903 to display a viewable segment by an oblique line, a thumbnail image 1904 corresponding to the viewable segment display area 1903, a check box 1905 to indicate a viewable playlist to be downloaded, and a download button 1906 to download the indicated viewable playlist.

In this way, the viewable playlist display screen 1901 visually displays a viewable playlist matched with each user's view right information. Accordingly, the user can easily understand contents of the viewable playlist. Furthermore, each user's view right information is sent to the playlist composition server 100, and a viewable playlist as the edited playlist based on the view right information is downloaded and used. Accordingly, the contents can be played according to the displayed viewable playlist.

In the prior art, before composing a viewable playlist, existing playlists composed by another user are visually displayed, a user's desired playlist is selected from the existing playlists, and a viewable playlist is composed from the selected playlist. In this case, contents are often played according to a playlist different from the displayed playlist. However, in the first embodiment, such problem does not occur.

Next, an example of composition processing of the viewable playlist is explained. In this example, after newly composing a playlist shown in FIG. 6 and registering the playlist to the playlist composition server 100 (a playlist identification information "1" is assigned to the playlist), a viewable playlist is composed from the playlist. Assume that a viewable playlist corresponding to the playlist identification information (indicated by the video view terminal 200) is not stored in the playlist memory 112, and copyright information of the contents is not stored in the copyright information memory 111. Furthermore, the copyright information shown in FIG. 8 is registered in the copyright management server 300.

First, playlist identification information "1" and the view right information shown in FIG. 3 are sent from the video view terminal 200 (S1402), and received by the playlist composition server 100 (S1403).

The playlist retrieval unit 105 retrieves a viewable playlist corresponding to the received information. In this case, the viewable playlist does not exist (No at S1404). Accordingly, the copyright information retrieval unit 104 retrieves copyright information corresponding to the received information from the copyright information memory 111, and decides whether the copyright information exists (S1406).

In this example, the copyright information does not exist in the playlist composition server 100 (No at S1406). Accordingly, the inter-servers transmission unit 103 sends contents identification information "A30657" (corresponding to the playlist identification information "1") and the view right information shown in FIG. 3 to the copyright management server 300 (S1408).

In FIG. 3, segmentation identification information included in the view right information is "1". Accordingly, the copyright management server 300 acquires a part having the segmentation identification information "1" from the copyright information shown in FIG. 8, and sends the part to the playlist composition server 100 (S1409).

By receiving the part of copyright information (S1410), the playlist composition server 100 composes a viewable playlist (S1411).

First, from a playlist shown in FIG. 6, a first start position and a first end position ("25:30:50" and "27:13:00") are acquired. Next, from view restriction segments included in the copyright information received, a view restriction segment having a start position and an end position overlapped with the first start position and the first end position are retrieved in order of the segment number.

In this example, a view restriction segment of the segment number "7" is extracted from the copyright information. Next, a sum of logical product between the personal copyright information "010" included in the view right information of FIG. 3 and the copyright designated information "111" corresponding to the segment number "7" is calculated (S1504). The sum is "1" (Yes at S1505), and decision processing of segment extraction information is executed (S1506).

In FIG. 3, the segment extraction information included in the view right information is "1" (No at S1506). Accordingly, a start position and an end position of the view restriction segment described in the copyright information are set as a start position and an end position of the viewable playlist (S1508). For example, a start position "23:00:00" and an end position "27:59:99" in the copyright information are added to the viewable playlist (They are not a start position "25:30:50" and an end position "27:13:00" in the playlist).

After that, a processing content corresponding to copyright rule information is acquired (S1509). In the copyright rule information corresponding to the segment number "7", the connection is "1", the order is "1", and the designation base is "0". As the processing content corresponding to these values, "It is confirmed that a relational view segment does not exist after a view restriction segment. In case of existing, the relational view segment is moved in order of segmentation of contents." is acquired as shown in FIG. 9.

This processing content is a rule to prohibit that a segment of a start position "00:00:00" and an end position "04:59:99" exists after a segment of a start position "25:30:50" and an end position "27:13:00". The playlist shown in FIG. 6 does not satisfy this rule. Accordingly, replacement processing of order of these two segments is executed. In this example, the order of the two segments is changed so that the segment of the start position "00:00:00" and the end position "04:59:99" is played before the segment of the start position "25:30:50" and the end position "27:13:00".

After that, it is decided whether another view restriction segment to be designated next exists (S1511). In this case, the segment number "7" is the last number (Yes at S1511). Accordingly, next start position "00:00:00" and next end position "03:30:00" are acquired from the playlist, and above processing is repeated (S1512, S1501).

Following detail processing is omitted. As for the second segment of a start position "00:00:00" and an end position "03:30:00" in the playlist, copyright rule information of the segment number "1" is designated. In this case, a segment of a start position "10:00:00" and an end position "10:59:99" are added.

Furthermore, as for the third segment of a start position "12:00:00" and an end position "13:48:59" in the playlist, copyright rule information of the segment number "5" is designated. In this case, a segment of a start position "22:00:00" and an end position "22:59:99" are added.

Figures 20, 21:
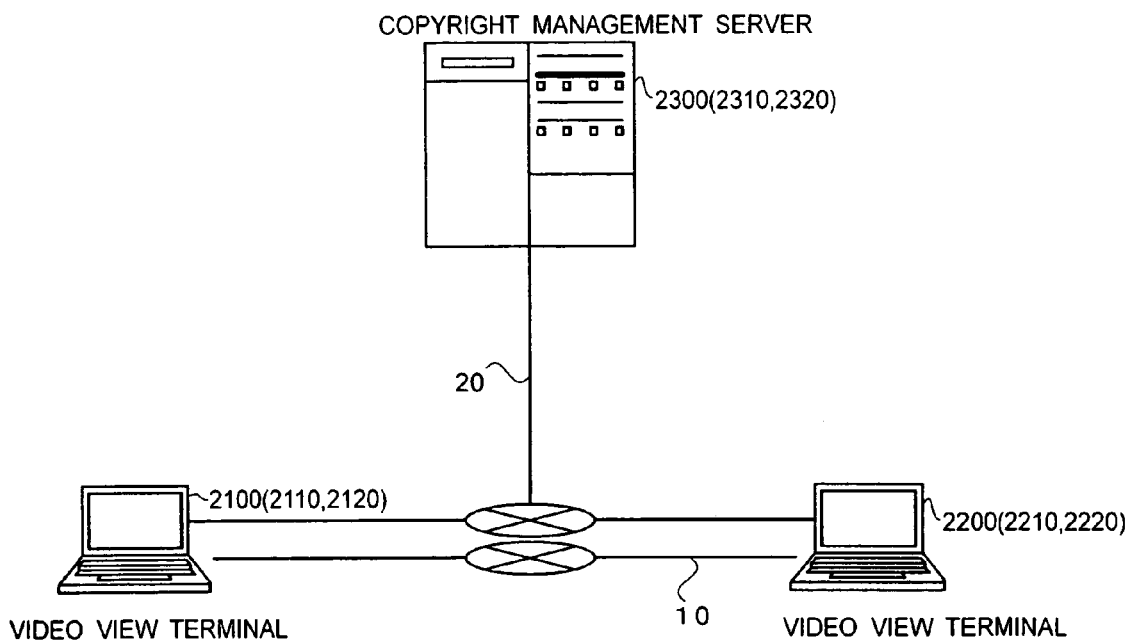
FIG. 20 is a schematic diagram of one example of the viewable playlist.
FIG. 21 is a block diagram of a contents management system according to second, third, and fourth embodiments.

Last, the viewable playlist shown in FIG. 20 is composed, and sent to the video view terminal 200 (S1412). By comparing the playlist of FIG. 6 with the viewable playlist of FIG. 20, specific features of the viewable playlist are easily understood. Briefly, when the viewable playlist is composed based on the playlist of FIG. 6 (composed by the user) by above-mentioned method, another segment to be viewed with some segment is added or a position of some segment is moved. As a result, the viewable playlist satisfying the copyright information set by the copywriter is composed as shown in FIG. 20.

In this way, in the first embodiment, a condition to view contents (set by the copywriter) is registered to the copyright management server 300. A user composes a playlist in the video view terminal, and registers the playlist to the playlist composition server 100. Based on the user's view condition and the playlist, the playlist composition server 100 composes a viewable playlist satisfying both conditions. Accordingly, the viewable playlist having high utility for the user can be composed while protecting copyright of the contents. Furthermore, the viewable playlist satisfying the condition can be composed from a playlist composed by another user. Accordingly, playlists can be shared among a plurality of users.

In the contents management system of the first embodiment, the playlist composition server 100 is prepared between the video view terminal 200 and the copyright management server 300, and the playlist composition server 100 composes a viewable playlist. On the other hand, in a contents management system of second, third, and fourth embodiments, the viewable playlist is composed without the playlist composition server 100.

FIG. 21 is a schematic diagram showing components of a contents management system according to the second, third, and fourth embodiments. As shown in FIG. 21, in the contents management system, a video view terminal 2100 (2110, 2120) and a video view terminal 2200 (2210, 2220) are connected via a network 10. Furthermore, the video view terminal 2100 (2110, 2120), the video view terminal 2200 (2210, 2220), and a copyright management server 2300 (2310, 2320) are connected via a network 20. In FIG. 21, different numbers are assigned to the video view terminal 2100 (2110, 2120) and the video view terminal 2200 (2210, 2220) because one terminal is a video view side and the other terminal is a viewable playlist composition side. However, each terminal has the same function.

In the second embodiment, a first video view terminal 2200 (to view contents) sends playlist identification information (to uniquely identify a playlist) and view right information of the user to a second video view terminal 2100 which stores a playlist corresponding to the playlist identification information. The second video view terminal 2100 edits the playlist based on the view right information and a copyright information (previously stored in the copyright information memory), and sends a viewable playlist as the editing result of the playlist to the first video view terminal 2200. After viewing contents based on the viewable playlist, the first video view terminal 2200 sends the viewable playlist and the view right information to the copyright management server 2300. Accordingly, while the viewable playlist composed by the second video view terminal 2100 is not always reliable, the first video view terminal 2200 can confirm whether the viewed contents infringe a copyright.

In the third embodiment, a first video view terminal 2210 (to view contents) sends playlist identification information (to uniquely identify a playlist) and view right information of the user to a second video view terminal 2110 which stores a playlist corresponding to the playlist identification information. The second video view terminal 2110 edits the playlist based on the view right information and copyright information (previously stored in the copyright information memory), and sends a viewable playlist as the editing result of the playlist to the first video view terminal 2210. While viewing contents based on the viewable playlist, the first video view terminal 2210 confirms whether the contents are justly constructed.

In the fourth embodiment, a first video view terminal 2220 (to view contents) receives a playlist from a second video view terminal 2120 which stores the playlist. The first video view terminal 2220 edits the playlist based on view right information of the user and copyright information (previously stored in the copyright information memory), and composes a viewable playlist as the editing result of the playlist. The first video view terminal 2220 sends the viewable playlist and the view right information to the copyright management server 2320. The copyright management server 2320 confirms whether the viewable playlist is composed based on the copyright information.

In the second, third, and fourth embodiments, the video view terminals 2100, 2110, 2220 compose a viewable playlist in a different way than the first embodiment. In this case, it is unclear that the viewable playlist is composed based on the copywriter's intent. Accordingly, it is confirmed whether the viewable playlist satisfies the view right information. Briefly, check function of the viewable playlist is prepared.

Figure 22:
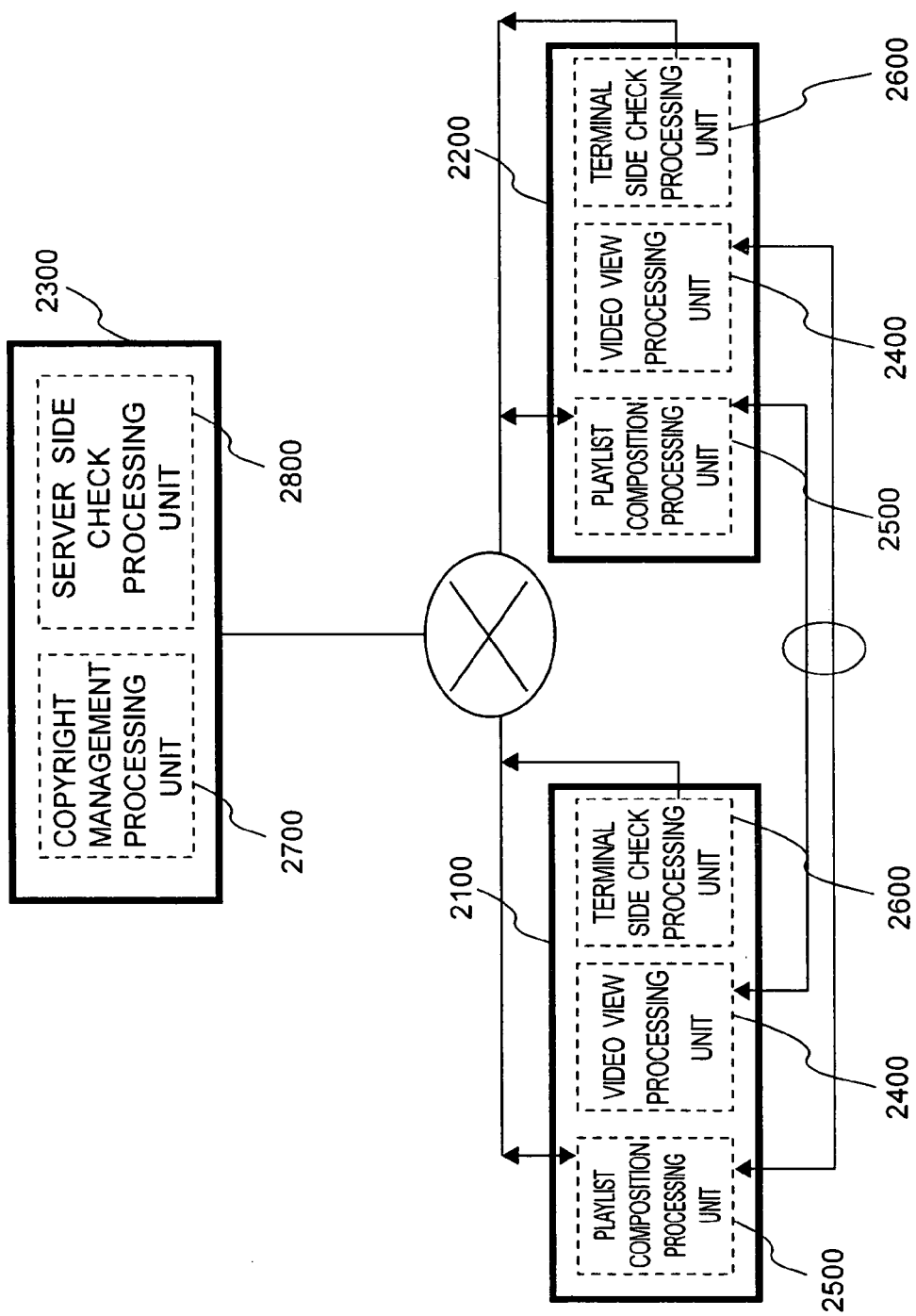
FIG. 22 is a block diagram of video view terminals 2100 and 2200, and a copyright management server 2300 of the contents management system according to the second embodiment.

Hereinafter, the second, third, and fourth embodiments are explained in order. First, the second embodiment is explained. FIG. 22 is a block diagram of functional component of the video view terminals 2100 and 2200, and the copyright management server 2300 in the contents management system of the second embodiment.

The video view terminals 2100 and 2200 include a video view processing unit 2400, a playlist composition processing unit 2500, and a terminal side check processing unit 2600. The video view processing unit 2400 performs each function of the video view terminal 200 of the first embodiment shown in FIG. 2. Accordingly, its explanation is omitted. Furthermore, the playlist composition processing unit 2500 performs each function of the playlist composition server 100 of the first embodiment shown in FIG. 10. Accordingly, its explanation is omitted. The video view processing unit 2400 (of one video view terminal 2100 or 2200) can be connected to the playlist composition processing unit 2500 (of the other video view terminal 2200 or 2100) via a network 10.

The terminal side check processing unit 2600 executes processing related to the video view terminal side (2100 or 2200) in order to check a viewable playlist utilized by a play unit 203 of the video view processing unit 2400. The terminal side check processing unit 2600 can be connected to the copyright management server 2300 via a network 20.

The copyright management server 2300 includes a copyright management processing unit 2700 and a server side check processing unit 2800. The copyright management processing unit 2700 prepares each function of the copyright management server 300 of the first embodiment shown in FIG. 7. Accordingly, its explanation is omitted. The server side check processing unit 2800 executes processing related to the copyright management server side 2300 in order to check a viewable playlist utilized by a play unit 203 of the video view processing unit 2400 of the video view terminal 2100 and 2200.

In above contents management system, the video view processing unit 2400 of the video view terminal 2200 (to view contents) requests a viewable playlist from the playlist composition processing unit 2500 of another video view terminal 2100 (which stores a playlist to be utilized by a user). After acquiring and playing the viewable playlist in the video view terminal 2200, the terminal side check processing unit 2600 and the server side check processing unit 2800 check the legality of the viewable playlist. In the second embodiment, this check is executed by the copyright management server 2300.

Figure 23:
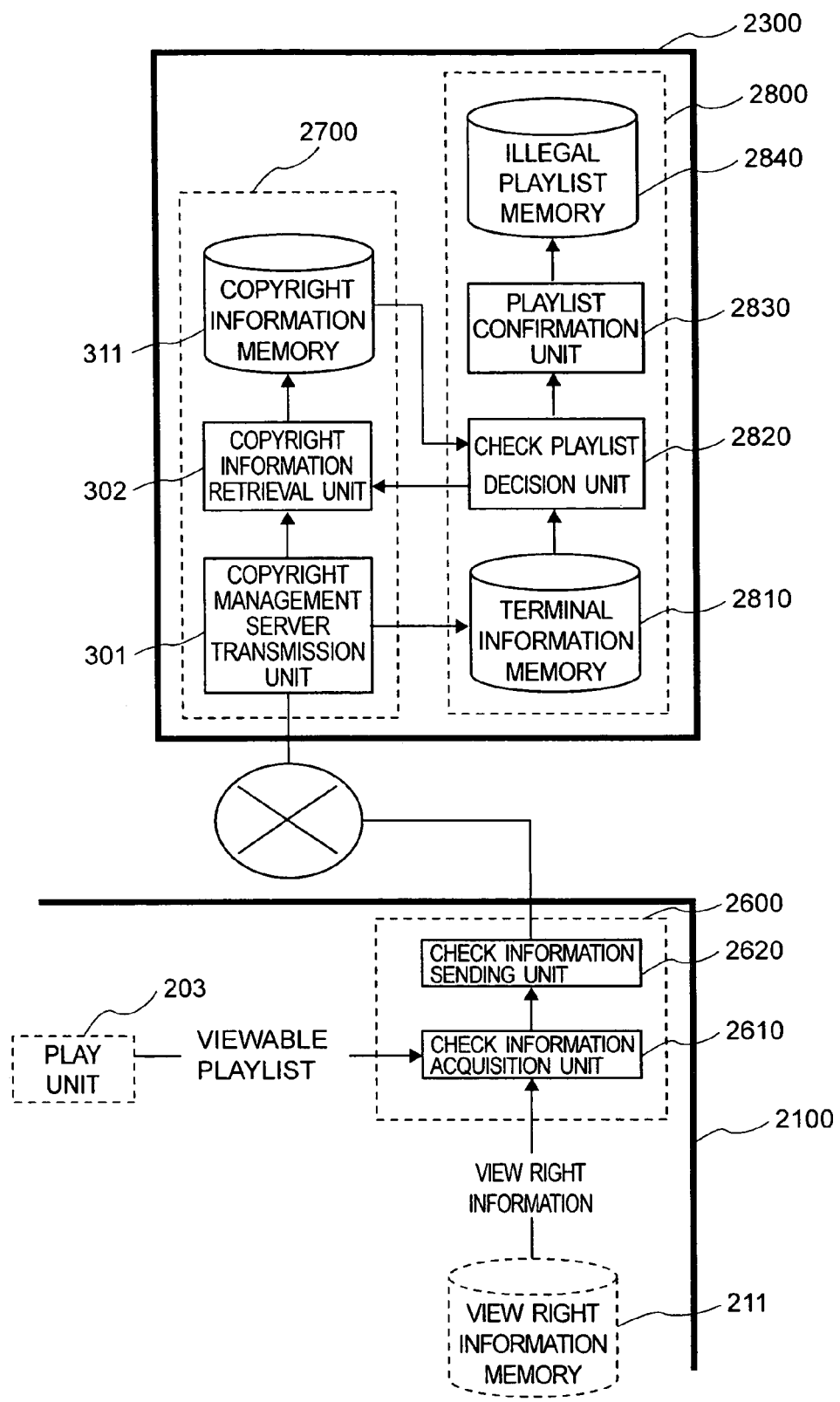
FIG. 23 is a functional block related to check in the contents management system according to the second embodiment.
Figure 25:
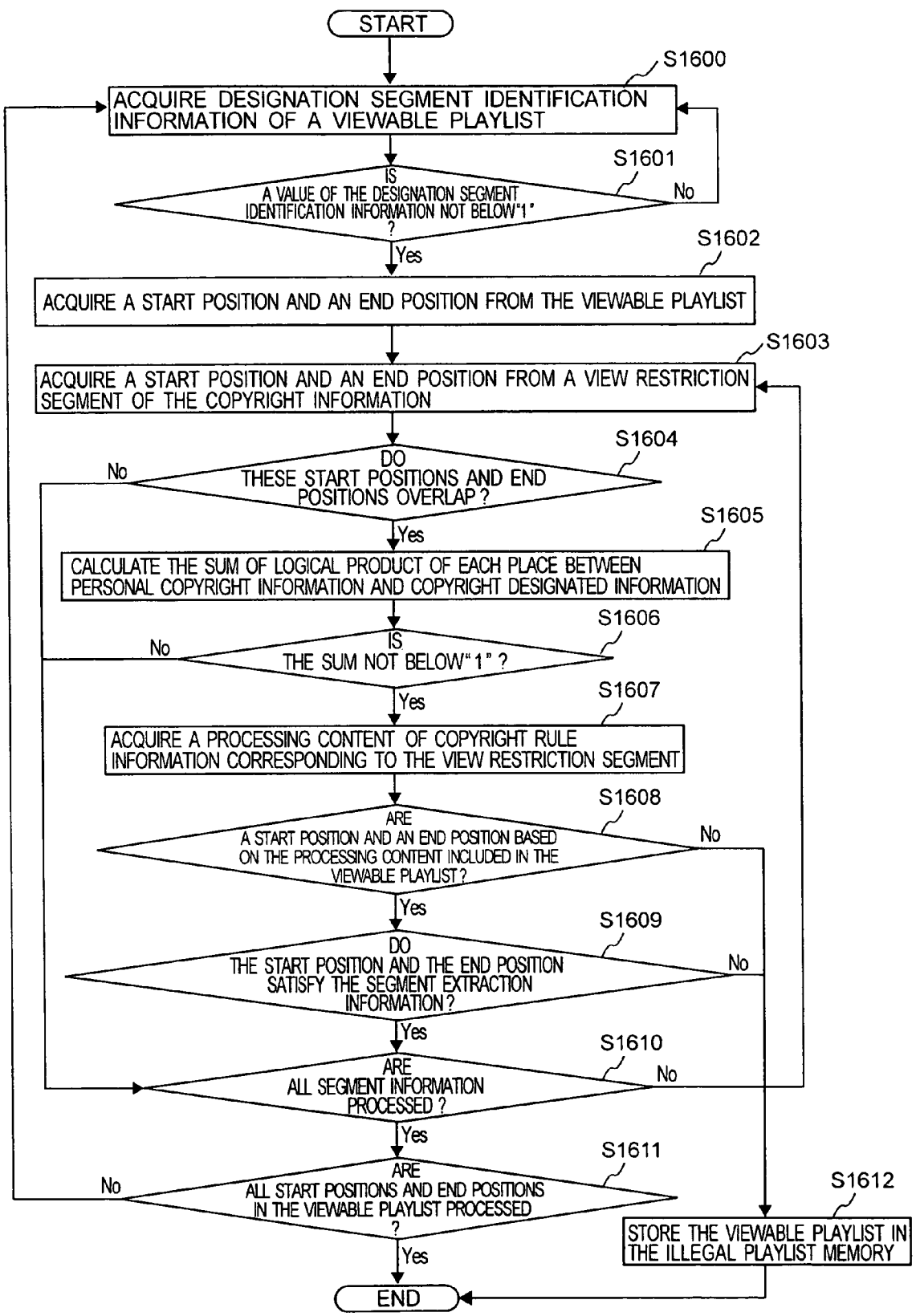
FIG. 25 is a flow chart of check processing of the viewable playlist according to the second embodiment.

Next, check processing of the viewable playlist is explained by referring to FIGS. 23~25. FIG. 23 is a functional block of the check processing in the contents management system.

The terminal side check processing unit 2600 includes a check information acquisition unit 2610 and a check information sending unit 2620. The check information acquisition unit 2610 acquires a viewable playlist from the play unit 203 before playing, during playing, or after playing. Furthermore, the check information acquisition unit 2610 acquires view right information from the view right information memory 211. The check information sending unit 2620 sends the viewable playlist and the view right information to the copyright management server 2300.

In the second embodiment, the data structure of a viewable playlist is different from the first embodiment shown in FIG. 20. FIG. 24 is a schematic diagram of data structure of the viewable playlist of the second embodiment. As easily understood by comparing FIG. 24 with FIG. 20, in the viewable playlist of the second embodiment, in addition to the viewable playlist of the first embodiment, designation segment identification information to identify whether each segment is a view restriction segment of copyright information is described. In case of the designation segment identification information "1", the segment is a view segment described in a playlist without designating the copyright information. In case of the designation segment identification information "0", the segment is a view restriction segment described in the copyright information. The designation segment identification information is assigned by the playlist composition unit 101 of the playlist composition processing unit 2500.

In the copyright management server 2300, the server side check processing unit 2800 includes a terminal information memory 2810, a check playlist decision unit 2820, a playlist confirmation unit 2830, and an illegal playlist memory 2840. The check playlist decision unit 2820 outputs a retrieval request to a copyright information retrieval unit 302 of the copyright management processing unit 2700, and acquires a retrieval result from a copyright information memory 311.

The terminal information memory 2810 temporarily stores a pair of the viewable playlist and the view right information received by the copyright management server transmission unit 301.

The check playlist decision unit 2820 regularly or irregularly selects one by one from a plurality of pairs of the viewable playlist and the view right information stored in the terminal information memory 2810, and acquires copyright information corresponding to contents identification information included in the viewable playlist selected.

The playlist confirmation unit 2830 checks whether the viewable playlist (selected by the check playlist decision unit 2820) is composed based on the view right information by referring to the copyright information. Detail check processing is explained afterwards.

The illegal playlist memory 2840 stores the viewable playlist when the playlist confirmation unit 2830 confirms that the viewable playlist is not composed based on the view right information.

FIG. 25 is a flow chart of check processing of the viewable playlist according to the second embodiment.

First, designation segment identification information of the viewable playlist is acquired (S1600). In FIG. 24, as for a first start position "00:00:00" and a first end position "04:59:99", the designation segment identification information "1" is acquired.

Next, it is decided whether a value of the designation segment identification information is "1" (S1601). In case of not "1" (No at S1601), this segment is a view segment described in the playlist, which is not an added segment based on the copyright information. Accordingly, this segment need not be checked.

In case of "1" (Yes at S1601), the start position and the end position are acquired (S1602). For example, in FIG. 24, "00:00:00" and "04:59:99" are acquired.

Next, a start position and an end position of the copyright information are acquired (S1603). For example, in the copyright information of FIG. 12, a first start position "00:00:00" and a first end position "04:59:99" are acquired.

Next, it is decided whether the start position and the end position of the viewable playlist acquired at S1602 overlap with the start position and the end position of the view restriction segment of the copyright information acquired at S1603 (S1604).

In the above example, the start position and the end position acquired from the viewable playlist are "00:00:00" and "04:59:99". On the other hand, the start position and the end position acquired from the copyright information are "00:00:00" and "04:59:99". Accordingly, these start positions and end positions are decided to overlap.

Next, a sum of logical product of each place between personal copyright information (included in the view right information) and copyright designated information (corresponding to a view restriction segment included in the copyright information) is calculated (S1605).

It is decided whether the sum is not below "1" (S1606). In case that the sum is below "1" (No at S1606), the view restriction segment need not be checked because a rule of the copyright information corresponding to the view restriction segment is not designated. In this case, it is decided whether all segment information are processed (S1610).

In case that the sum is not below "1" (Yes at S1606), a processing content of a copyright rule information corresponding the view restriction segment is acquired (S1607). For example, in the same way as composition of the viewable playlist, a connection, an order, and a designation base included in the copyright rule information corresponding to the view restriction segment are acquired. The processing content is acquired based on these values (combination of values of the connection, the order and the designation base) as shown in FIG. 9.

Next, it is confirmed whether the processing content is executed to the viewable playlist (S1608).

In above example, it is confirmed that a start position and an end position ("10:00:00" and "10:59:99") of a relational view segment (described in the copyright information) exists just after the first start position and the first end position ("00:00:00" and "04:59:99") indicated by the connection "1" and the order "0" in FIG. 9.

If it is not confirmed (No at S1608), the viewable playlist is not composed based on the copyright information. Accordingly, the viewable playlist and the view right information are stored in the injustice playlist memory 2840 (S1612).

If it is confirmed (Yes at S1608), it is confirmed whether the start position and the end position of the viewable playlist are described based on the segment extraction information (S1609).

If it is not confirmed (No at S1609), the viewable playlist is not composed based on the copyright information. Accordingly, the viewable playlist and the view right information are stored in the illegal playlist memory 2840 (S1612).

If it is confirmed (Yes at S1609), it is decided whether all segment information in the copyright information is designated to the start position and the end position being processed (S1610). If all segment information is not designated (No at S1610), the next view restriction segment is acquired from the segment information of the copyright information, and the above processing is repeated.

If all segment information is designated (Yes at S1610), it is decided whether all segments (all start positions and end positions) in the viewable playlist are checked (S1611).

If all segments in the viewable playlist are not checked (No at S1611), the next start position and the next end position are acquired from the viewable playlist (S1600).

If all segments in the viewable playlist are checked (Yes at S1611), check processing of the viewable playlist is completed, and the viewable playlist checked is decided to be composed based on the view right information.

As mentioned-above, in the second embodiment, a special server to compose a viewable playlist is not necessary. The viewable playlist can be provided between two video view terminals. Furthermore, the copyright management server checks whether the viewable playlist is legally composed. As a result, some measure can be taken for the video view terminal preserving an illegal viewable playlist.

In the second embodiment, by preparing a check function of a viewable playlist in the copyright management server (operated by a reliable organization), illegal use of the viewable playlist can be controlled (discovery of illegal use). On the other hand, in order for a sensible user to quickly discover an illegal view (guarantee of legal use), the check function may be a view terminal side. If the check function is prepared for the view terminal side, for example, while viewing contents based on a viewable playlist, it can be confirmed whether the viewable playlist satisfies the copyright information. Furthermore, in order to realize "discovery of illegal use" and "guarantee of legal use", the check function may be prepared in the view terminal side and the copyright management side. Such variation can be realized by following system component based on the purpose.

In the third embodiment, the check function is prepared in the view terminal side. In comparison with the second embodiment, the check function of the third embodiment is only different. Accordingly, except for component (FIG. 23) of the check function, other component is the same as the second embodiment, and its explanation is omitted.

Figure 26:
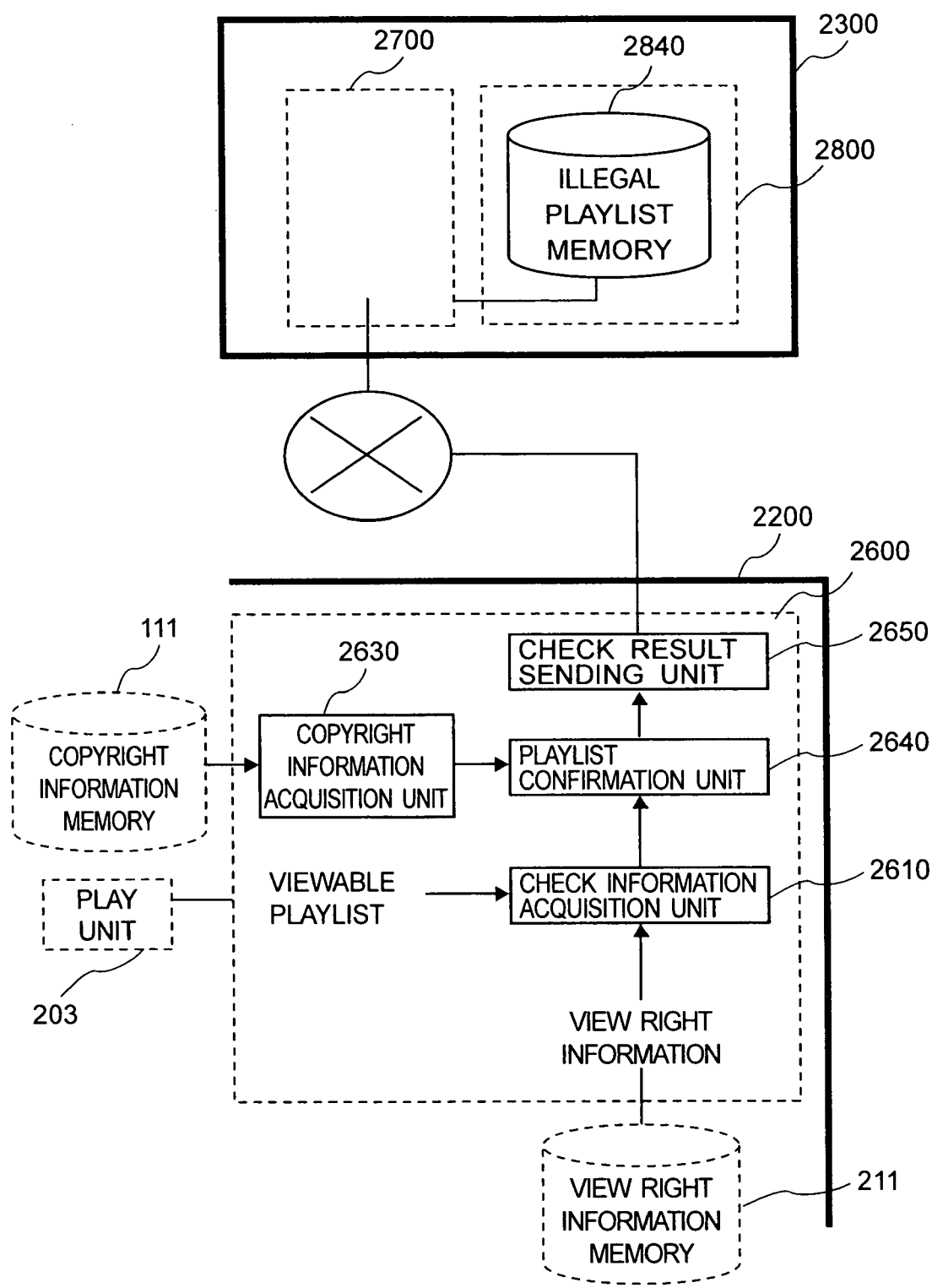
FIG. 26 is a functional block related to check in the contents management system according to the-third embodiment.

FIG. 26 is a functional block related to check according to the third embodiment.

The terminal side check processing unit 2600 includes a check information acquisition unit 2610, a copyright information acquisition unit 2630, a playlist confirmation unit 2640, and a check result sending unit 2650. The server side check processing unit 2800 includes an illegal playlist memory 2840.

The check information acquisition unit 2610 acquires a viewable playlist being played from the play unit 203, and acquires view right information from the view right information memory 211.

The copyright information acquisition unit 2630 requests copyright information based on contents identification information (included in the viewable playlist) to the copyright information retrieval unit 104 of the playlist composition processing unit 2500, and acquires the copyright information stored in the copyright information memory 111.

The playlist confirmation unit 2640 acquires the viewable playlist and the view right information from the check information acquisition unit 2610, and acquires the copyright information from the copyright information acquisition unit 2630. Furthermore, the playlist confirmation unit 2640 confirms whether the viewable playlist is justly composed based on the view right information and the copyright information. If the viewable playlist is decided to be legally composed, the playlist confirmation unit 2640 executes nothing. On the other hand, if the viewable playlist is not decided to be legally composed, the playlist confirmation unit 2640 informs the play unit 203 to stop playing the contents.

If the viewable playlist is not decided to be legally composed, the check result sending unit 2650 sends a pair of the viewable playlist and the view right information to the copyright management server 2300.

The illegal playlist memory 2840 stores information sent by the check result sending unit 2650.

As mentioned-above, in the third embodiment, in addition to effect of the second embodiment, legality of a viewable playlist is confirmed in a video view terminal side. In case that the confirmation result is illegal, the viewable playlist and the view right information are stored as a pair in the copyright management side. Accordingly, the copyright management side can notice the illegal use. Moreover, if legality of the viewable playlist is left to a user's personal responsibility (the copyright management server has nothing to do with this matter), the illegal playlist memory 2840 is not necessary.

Next, the fourth embodiment is explained. In the fourth embodiment, a first video view terminal (to view contents) receives a playlist from a second video view terminal which stores the playlist. The first video view terminal edits the playlist based on view right information of the user (set in the first video view terminal) and copyright information (registered in the copyright information memory), and composes a viewable playlist as the editing result of the playlist. The first video view terminal 2220 sends the viewable playlist and the view right information to the copyright management server. The copyright management server confirms whether the viewable playlist is composed based on the copyright information. Briefly, the viewable playlist is composed by the video view terminal to view contents.

Figure 27:
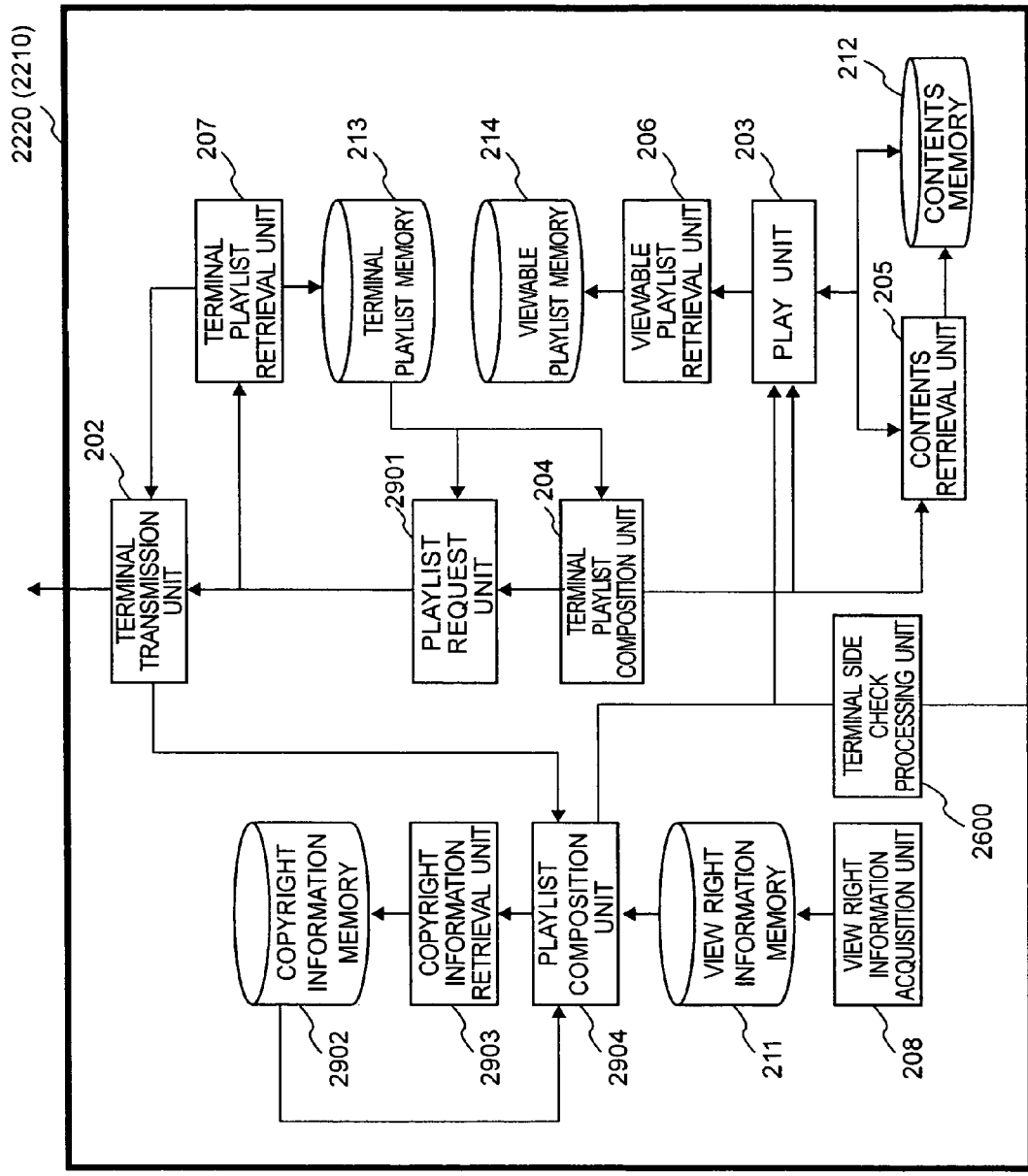
FIG. 27 is a block diagram of video view terminals of the contents management system according to the fourth embodiment.

The components of the contents management system of the fourth embodiment are shown in FIG. 21. A video view terminal 2120 and a video view terminal 2220 are connected via a network 10. Furthermore, the video view terminal 2120, the video view terminal 2220, and a copyright management server 2320 are connected via a network 20. In the fourth embodiment, internal components of the copyright management server 2320 are the same as the copyright management server 2300 of the second embodiment. Accordingly, further explanation is omitted. On the other hand, inner components of the video view terminals 2120 and 2220 include the same parts and different parts in comparison with the video view terminals of the first, second, and third embodiments. Accordingly, the block diagram of the video view terminal is shown in FIG. 27, and the processing is explained afterwards. In the same way as the second and third embodiments, the video view terminal 2120 and the video view terminal 2220 are the same. Accordingly, each processing is not doubly explained. Furthermore, for convenience sake, in the following explanation, the video view terminal 2220 is a terminal of the user to view based on the viewable playlist, and the video view terminal 2120 is a terminal which stores a playlist from which the viewable playlist is composed.

As shown in FIG. 27, the video view terminal 2220 includes a terminal transmission unit 202, a play unit 203, a terminal playlist composition unit 204, a contents retrieval unit 205, a terminal playlist retrieval unit 207, a view right information acquisition unit 208, a view right information memory 211, a contents memory 212, and a terminal playlist memory 213. These units respectively have the same function as each unit of the same name and the same number in the first embodiment, and further explanation is omitted. The video view terminal 2220 also includes the terminal side check processing unit 2600 having a check information acquisition unit 2610 and a check information sending unit 2650. These units respectively have the same function as each unit of the same name and the same number in the second embodiment, and further explanation is omitted. The video view terminal 2220 also includes a playlist request unit 2901, a copyright information memory 2902, a copyright information retrieval unit 2903, and a playlist composition unit 2904.

The playlist request unit 2901 requests a playlist managed by (stored in) another video view terminal 2120. In case of requesting the playlist to the video view terminal 2120, the video view terminal 2220 sends playlist identification information of the playlist to the video view terminal 2120 via the terminal transmission unit 202.

The copyright information memory 2902 and the copyright information retrieval unit 2903 respectively have the same function as the copyright information memory 112 and the copyright information retrieval unit 105 of the playlist composition server 100 in the first embodiment. If copyright information of contents described in the playlist (received by the terminal transmission unit 202) is not stored in the copyright information memory 2902, the copyright information is acquired from the copyright management server 2320 and stored.

The playlist composition unit 2904 composes a viewable playlist based on the playlist received from the video view terminal 2120 via the network 10, the view right information stored in the view right information memory 211, and the copyright information received from the copyright management server 300 via the network 20.

Figure 28:
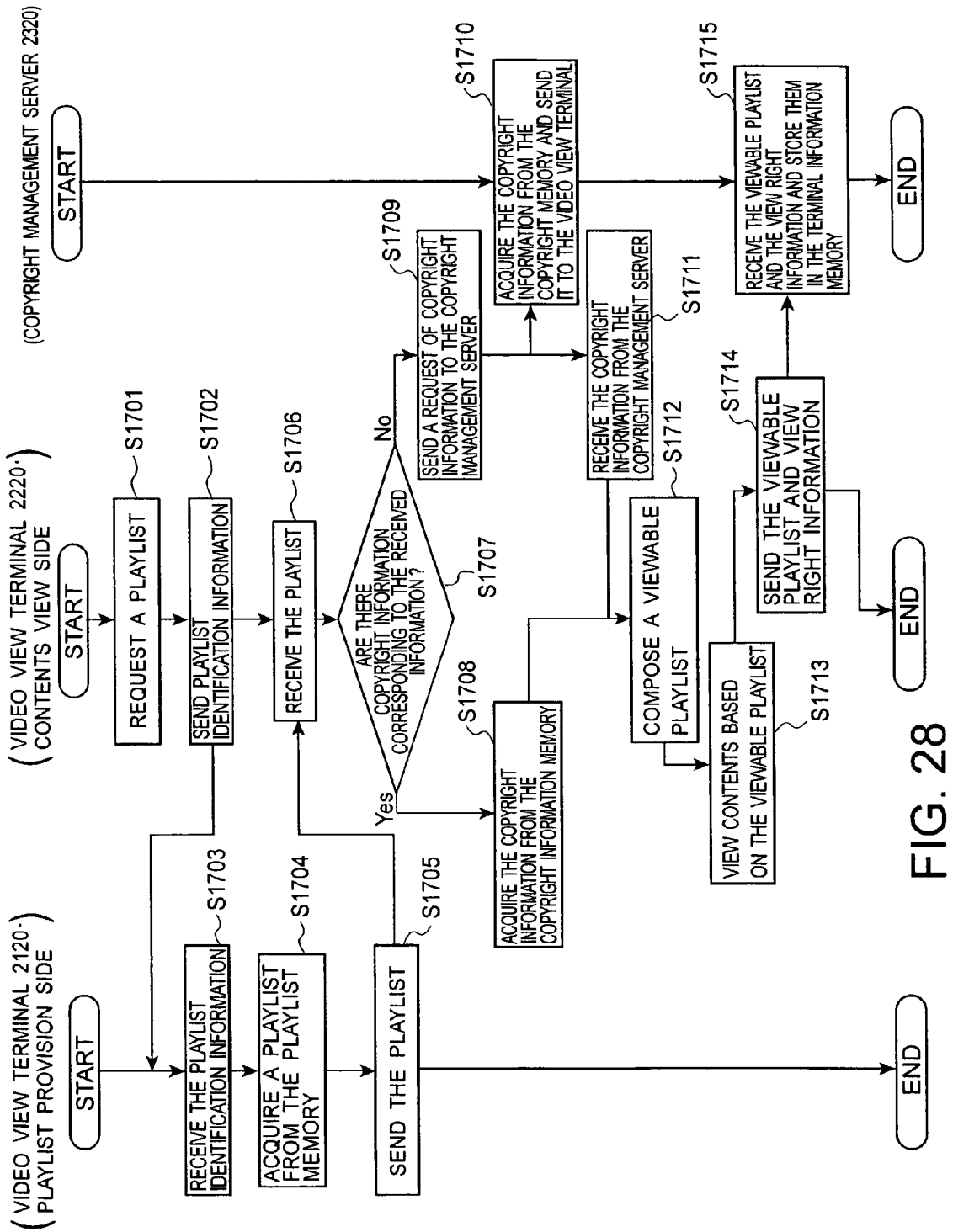
FIG. 28 is a flow chart of entire processing of the contents management system according to the fourth embodiment.

FIG. 28 is a flow chart of the processing of a request for and receiving of a playlist, composition of a viewable playlist, viewing of contents, and sending to the copyright management server according to the fourth embodiment.

First, in the video view terminal 2220, as for a playlist selected by a user from playlist information displayed, the playlist request unit 2901 requests the playlist (S1701). The terminal transmission unit 202 sends playlist identification information of the playlist to the video view terminal 2120 (S1702).

Next, in the video view terminal 2120, the terminal transmission unit 202 receives the playlist identification information sent by the terminal transmission unit 202 of the video view terminal 2220 (S1703). Continually, the terminal playlist retrieval unit 207 retrieves the playlist corresponding to the playlist identification information from the terminal playlist memory 213 (S1704). Furthermore, the terminal transmission unit 202 sends the playlist to the video view terminal 2220 (S1705).

Next, in the video view terminal 2220, the terminal transmission unit 202 receives the playlist sent by the terminal transmission unit 202 of the video view terminal 2120 (S1706). Continually, the copyright information retrieval unit 2903 decides whether copyright information of contents described in the playlist is stored in the copyright information memory 2902 (S1707). This decision is the same as above-mentioned embodiments.

If the copyright information is stored (Yes at S1707), the copyright information retrieval unit 2903 acquires the copyright information from the copyright information memory 2902 (S1708). In this way, by utilizing the copyright information already registered, the burden to transmit information to the copyright management server 2320 can be reduced.

If the copyright information is not stored (No at. S1707), a server transmission unit (not shown in FIG. 27) sends an acquisition request of the copyright information to the copyright management server 2320 (S1709). For example, contents identification information and view right information are sent to the copyright management server 2320.

Next, in the copyright management server 2320, the copyright management server transmission unit 301 receives the contents identification information and the view right information sent from the video view terminal 2220, acquires the copyright information corresponding to the contents identification information and the view right information from the copyright information memory 311, and sends the copyright information to the video view terminal 2220 (S1710).

Next, in the video view terminal 2220, the server transmission unit (not shown in FIG. 27) receives the copyright information sent from the copyright management server transmission unit 301 of the copyright management server 2320 (S1711).

After acquiring the copyright information from the copyright information memory 2902 (S1708) or after receiving the copyright information from the copyright management server transmission unit 301 (S1710), the playlist composition unit 2904 executes a viewable playlist composition processing (S1712). The playlist composition unit 2904 composes a viewable playlist by using the playlist, the view right information (from the view right information memory 211), and the copyright information (S1712). The viewable playlist composition processing is the same as in the above-mentioned embodiments.

After composing the viewable playlist, the play unit 203 plays the contents based on the viewable playlist (S1713).

After playing the contents (S1713), the terminal side check processing unit 2600 of the video view terminal 2220 sends the viewable playlist and the view right information to the copyright management server 2320 (S1714).

In the copyright management server 2320, the copyright management server transmission unit 301 receives the viewable playlist and the view right information sent from the terminal side check processing unit 2600 of the video view terminal 2220, and stores them in the terminal information memory 2810 (S1715).

After that, the copyright management server 2320 checks whether the viewable playlist is legally composed based on the view right information (stored in the terminal information memory 2810). This check processing is the same as in the second embodiment.

The terminal side check processing unit 2600 in the video view terminals 2120 and 2220, and the server side check processing unit 2800 in the copyright management server 2320, may be respectively changed to the check method of the third embodiment.

As mentioned-above, in the fourth embodiment in addition to effect of the second and third embodiments, a viewable playlist is composed in the video view terminal to view contents, and view right information of the user need not be sent to another video view terminal. As a result, in case of composing the view playlist, a problem such as alternation of the view right information does not occur. Accordingly, as for the user who views contents, reliability of the viewable playlist rises. Furthermore, the another video view terminal which stores a playlist need not compose the viewable playlist. Accordingly, processing ability of the another video view terminal can be suppressed, and a user can always use the another video view terminal by reducing processing load to compose the viewable playlist.

In the disclosed embodiments, the processing can be accomplished by a computer-executable program, and this program can be realized in a computer-readable memory device.

In the embodiments, the memory device, such as a magnetic disk, a flexible disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and soon. In short, the equipment and the apparatus that can execute the functions in embodiments using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A playlist composition apparatus, comprising:
a playlist acquisition component executed on a processor that acquires a playlist including a plurality of view segments of contents for a user, each view segment indicating a start position and an end position in the contents;
a copyright information acquisition component that acquires copyright information of a copywriter of the contents from a copyright management apparatus via a network, the copyright information including connection information and ordered information,
the connection information including at least one of a continuous connection that two view segments are continuously played, and an ordered connection that two view segments are played in a predetermined order,
the ordered information including at least one of a compulsion that another view segment is to be played when one view segment is played, and a prohibition that another view segment is prohibited to play when one view segment is played;
a view right information acquisition component that acquires view right information of the user, the view right information describing the user's right to view the contents; and
a viewable playlist composition component that selects at least one of the connection information and the ordered information to match with the view right information, and to compose a viewable playlist by editing the playlist, the viewable playlist being restricted by the at least one selected.

2. The playlist composition apparatus according to claim 1, further comprising
a playlist storage component that correspondingly stores the playlist and playlist identification information of the playlist; and
a copyright information storage component that to stores the copyright information acquired by said copyright information acquisition component.

3. The playlist composition apparatus according to claim 2, wherein
said view right information acquisition component receives the view right information with the playlist identification information from a view terminal apparatus related to the user via the network,
said playlist acquisition component retrieves the playlist corresponding to the playlist identification information from said playlist storage component, and
said viewable playlist composition component composes the viewable playlist from the playlist retrieved by said playlist acquisition component.

4. The playlist composition apparatus according to claim 1, further comprising
a view right information storage component that stores the view right information of the user; and
a copyright information storage component that stores the copyright information of the contents.

5. The playlist composition apparatus according to claim 4, wherein
said viewable playlist composition component composes the viewable playlist from the playlist using the copyright information stored in said copyright information storage component and the view right information stored in said view right information storage component.

6. The playlist composition apparatus according to claim 1, wherein
the copyright information includes a segmentation information and a contents identification information to uniquely identify the contents, the segmentation information including at least one view restriction segment and a copyright designated information, the view restriction segment being a start position and an end position of a part restricted to view in the contents, the copyright designated information being a condition to designate the view restriction segment, and
the playlist includes the contents identification information and at least one view segment.

7. The playlist composition apparatus according to claim 6, wherein
said copyright information acquisition component receives the copyright information of contents corresponding to the contents identification information included in the playlist, and
said playlist composition component extracts the view restriction segment corresponding to the copyright designated information matched with the view right information from the segmentation information, and composes the viewable playlist by combining the contents identification information with the view restriction segment extracted.

8. The playlist composition apparatus according to claim 7, wherein
the copyright information includes a copyright rule information,
the segmentation information includes a relational view segment, the relational view segment being a start position and an end position of a part related to the view restriction segment, the copyright rule information being a condition to relationally view the view restriction segment and the relational view segment, and
said viewable playlist composition component composes the viewable playlist by combining the contents identification information and the view restriction segment with the relational view segment based on the copyright rule information.

9. The playlist composition apparatus according to claim 8, wherein
the copyright rule information includes the continuous connection as a rule to continuously view the view restriction segment and the relational view segment or the ordered connection as a rule to view the view restriction segment and the relational view segment based on a predetermined order.

10. The playlist composition apparatus according to claim 8, wherein
the copyright rule information includes the compulsion as a rule to view the relational view segment in case of viewing the view restriction segment or the prohibition as a rule to prohibit view of the relational view segment in case of viewing the view restriction segment.

11. The playlist composition apparatus according to claim 6, wherein
the copyright information includes segmentation information, segmentation identification information to uniquely identify the segmentation information, and contents identification information to uniquely identify the contents, and the view right information includes the segmentation identification information.

12. The playlist composition apparatus according to claim 11, wherein
said copyright information acquisition component receives the copyright information of contents corresponding to the contents identification information included in the playlist and the segmentation identification information included in the view right information.

13. The playlist composition apparatus according to claim 6, wherein
the view right information includes segment extraction information representing which of the view segment and the view restriction segment is selected, and
said viewable playlist composition component composes the viewable playlist by combining the contents identification information with the view segment or the view restriction segment based on the segment extraction information.

14. A copyright management apparatus, comprising:
a copyright information storage unit that stores copyright information including all three of segmentation information, copyright rule information and contents identification information to uniquely identify contents, the segmentation information including at least one view restriction segment and copyright designated information, the view restriction segment indicating a start position and an end position of restricted view contents, the copyright designated information being a condition to designate the view restriction segment, the copyright rule information including connection information and ordered information,
the connection information including at least one of a continuous connection that two view segments are continuously played, and an ordered connection that two view segments are played in a predetermined order, the ordered information including at least one of a compulsion that another view segment is to be played when one view segment is played, and a prohibition that another view segment is prohibited to play when one view segment is played;

a receiving unit executed on a processor that receives the contents identification information from a playlist composition apparatus via a network;

a retrieval unit that retrieves the copyright information corresponding to the contents identification information received by said receiving unit from said copyright information storage unit; and a sending unit that sends the copyright information retrieved by said retrieval unit to the playlist composition apparatus.

15. The copyright management apparatus according to claim 14, wherein said receiving unit receives the viewable playlist and view right information from a view terminal apparatus related to the user via the network, the view right information describing the user's right to view the contents.

16. The copyright management apparatus according to claim 15, further comprising:

a view information storage unit that stores the viewable playlist and the view right information received by said receiving unit; and a playlist check unit that checks whether the viewable playlist is composed based on the view right information.

17. The copyright management apparatus according to claim 16, wherein said playlist check unit selects a pair of the viewable playlist and the view right information to be checked from said view information storage unit, selects the copyright information corresponding to the contents identification information included in the viewable playlist from said copyright information storage unit, and checks whether the viewable playlist is legally composed based on the copyright information.

18. The copyright management apparatus according to claim 14, further comprising:

an illegal playlist storage unit that stores the viewable playlist and the view right information sent from the view terminal apparatus via the network, after the view terminal apparatus decides that the viewable playlist is not legally composed.

19. A method for composing a playlist, comprising:

acquiring a playlist including a plurality of a view segments of contents for a user, each view segment indicating a start position and an end position in the contents;

acquiring copyright information of a copywriter of the contents from a copyright management apparatus via a network, the copyright information including connection information and ordered information, the connection information including at least one of a continuous connection that two view segments are continuously played, and an ordered connection that two view segments are played in a predetermined order, the ordered information including at least one of a compulsion that another view segment is to be played when one view segment is played, and a prohibition that another view segment is prohibited to play when one view segment is played;

acquiring view right information of the user, the view right information describing the user's right to view the contents; and selecting at least one of the connection information and the ordered information to match with the view right information; and composing a viewable playlist by editing the playlist, the viewable playlist being restricted by the at least one selected.

20. A method for managing copyright information, comprising:

storing copyright information including all three of segmentation information, copyright rule information and contents identification information to uniquely identify contents in a memory, the segmentation information including at least one view restriction segment and copyright designated information, the view restriction segment indicating a start position and an end position of restricted view contents, the copyright designated information being a condition to designate the view restriction segment, the copyright rule information including connection information and ordered information, the connection information including at least one of a continuous connection that two view segments are continuously played, and an ordered connection that two view segments are played in a predetermined order, the ordered information including at least one of a compulsion that another view segment is to be played when one view segment is played, and a prohibition that another view segment is prohibited to play when one view segment is played;

receiving the contents identification information from a playlist composition apparatus via a network;

retrieving the copyright information corresponding to the contents identification information received from the memory; and sending the retrieved copyright information to the playlist composition apparatus.

21. A computer program product, comprising:

a computer readable program code executing on a computer and embodied in said product for causing the computer to compose a playlist, said computer readable program code comprising:

a first program code to acquire a playlist including a plurality of view segments of contents for a user, each view segment indicating a start position and an end position in the contents;

a second program code to acquire copyright information of a copywriter of the contents from a copyright management apparatus via a network, the copyright information including connection information and ordered information, the connection information including at least one of a continuous connection that two view segments are continuously played, and an ordered connection that two view segments are played in a predetermined order, the ordered information including at least one of a compulsion that another view segment is to be played when one view segment is played, and a prohibition that another view segment is prohibited to play when one view segment is played;

a third program code to acquire view right information of the user, the view right information describing the user's right to view the contents;

a fourth program code to select at least one of the connection information and the ordered information to match with the view right information; and a fifth program code to compose a viewable playlist by editing the playlist, the viewable playlist being restricted by the at least one selected.

22. A computer program product, comprising:

a computer readable program code embodied in said product and executed by a processor for causing a computer to manage copyright information, said computer readable program code comprising:

a first program code to store copyright information including all three of segmentation information, copyright rule information and contents identification information to uniquely identify contents in a memory, the segmentation information including at least one view restriction segment and copyright designated information, the view restriction segment indicating a start position and an end position of restricted view contents, the copyright designated information being a condition to designate the view restriction segment, the copyright rule information including connection information and ordered information, the connection information including at least one of a continuous connection that two view segments are continuously played, and an ordered connection that two view segments are played in a predetermined order, the ordered information including at least one of a compulsion that another view segment is to be played when one view segment is played, and a prohibition that another view segment is prohibited to play when one view segment is played;

a second program code to receive the contents identification information from a playlist composition apparatus via a network;

a third program code to retrieve the copyright information corresponding to the contents identification information received from the memory; and a fourth program code to send the retrieved copyright information to the playlist composition apparatus.

* * * * *